(12) United States Patent
Igarashi et al.

(10) Patent No.: US 9,336,797 B2
(45) Date of Patent: May 10, 2016

(54) EXTENDED SPIN TORQUE OSCILLATOR

(71) Applicant: HGST Netherlands B.V., Amsterdam (NL)

(72) Inventors: Masukazu Igarashi, Kawagoe (JP); Masato Matsubara, Kanagawa (JP); Keiichi Nagasaka, Isehara (JP); Yo Sato, Odawara (JP); Masato Shiimoto, Odawara (JP); Masashige Sato, Atsugi (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/290,768

(22) Filed: May 29, 2014

(65) Prior Publication Data

US 2015/0348574 A1    Dec. 3, 2015

(51) Int. Cl.
*G11B 5/00* (2006.01)
*G11B 5/127* (2006.01)

(52) U.S. Cl.
CPC ............ *G11B 5/00* (2013.01); *G11B 5/1278* (2013.01); *G11B 2005/0024* (2013.01)

(58) Field of Classification Search
USPC ...................................................... 360/125.3
See application file for complete search history.

(56) References Cited

U.S. PATENT DOCUMENTS

| | | | |
|---|---|---|---|
| 7,678,475 B2 | 3/2010 | Slavin et al. | |
| 7,821,088 B2 | 10/2010 | Nguyen et al. | |
| 7,936,598 B2* | 5/2011 | Zheng et al. | 365/173 |
| 7,982,996 B2* | 7/2011 | Smith et al. | 360/59 |
| 8,274,811 B2* | 9/2012 | Zhang et al. | 365/145 |
| 8,446,690 B2 | 5/2013 | Alex et al. | |
| 8,553,372 B2 | 10/2013 | Nagasawa et al. | |
| 9,007,723 B1* | 4/2015 | Igarashi et al. | 360/125.3 |
| 2008/0019040 A1 | 1/2008 | Zhu et al. | |
| 2012/0154063 A1 | 6/2012 | Nikonov et al. | |
| 2013/0222092 A1 | 8/2013 | Nakada et al. | |

FOREIGN PATENT DOCUMENTS

JP        5172004  B1    3/2013

OTHER PUBLICATIONS

Garashi, M; "Oscillation Feature of Planar Spin-Torque Oscillator for Microwave-Assisted Magnetic Recording"; IEEE Transactions on Magnetics; vol. 16, Issue 10; Oct. 2010.

* cited by examiner

*Primary Examiner* — Carlos E Garcia
(74) *Attorney, Agent, or Firm* — Patterson & Sheridan, LLP

(57) ABSTRACT

The present disclosure generally relates to a high-frequency oscillator for use in a recording device having a microwave-assisted magnetic recording head. The microwave-assisted magnetic recording head achieves a large assist effect by using an extended spin torque oscillator disposed between a main magnetic pole and a pole opposite the main magnetic pole. The spin torque oscillator obtains a strong high-frequency magnetic field and comprises a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. The spin torque oscillator has a drive current flowing though in the direction from the first magnetic field generating layer to the reference layer.

20 Claims, 29 Drawing Sheets

| | | RL | | | S(RL-FC) | | FGL1 | | | S(FGL1-F) | | FGL2 | | | ΔS/N |
|---|---|---|---|---|---|---|---|---|---|---|---|---|---|---|---|
| | No | Mat. | Bs(T) | t(nm) | Mat. | t(nM) | Mat. | Bs(T) | t(nm) | Mat. | t(nm) | Mat. | Bs(T) | t(nm) | 10T |
| 1 | 717 | Ni | 0.49 | 3 | Cu | 3 | FeCo | 2.35 | 6 | Cu | 0.3 | FeCo | 2.35 | 5 | 5.3 |
| 2 | 397 | (Ni/Co)n | 1.3 | 1.5 | NiAl | 3 | FeCo | 2.35 | 6 | NiA | 0.3 | FeCo | 2.35 | 5 | 5.2 |
| 3 | 725 | Ni | 0.49 | 3 | Cu | 3 | FeCo | 2.35 | 6 | Cu | 0.3 | Fe | 2.2 | 5 | 5.0 |
| 4 | 405 | (Ni/Co)n | 1.3 | 1.5 | Cu | 3 | FeCo | 2.35 | 6 | NiA | 0.3 | Fe | 2.2 | 5 | 4.9 |
| 5 | 716 | Ni | 0.49 | 3 | Cu | 3 | FeCo | 2.35 | 6 | Cu | 0.3 | FeCo | 2.35 | 4 | 4.8 |
| 6 | 756 | Ni | 0.49 | 3 | Cu | 3 | FeCo | 2.35 | 6 | NiA | 0.5 | FeCo | 2.35 | 4 | 4.8 |
| 7 | 396 | (Ni/Co)n | 1.3 | 1.5 | NiAl | 3 | FeCo | 2.35 | 6 | Cu | 0.3 | FeCo | 2.35 | 4 | 4.7 |
| 8 | 724 | Ni | 0.49 | 3 | Cu | 3 | FeCo | 2.35 | 6 | Cu | 0.3 | Fe | 2.2 | 4 | 4.7 |
| 9 | 764 | Ni | 0.49 | 3 | Cu | 3 | FeCo | 2.35 | 6 | Cu | 0.5 | Fe | 2.2 | 4 | 4.7 |
| 10 | 404 | (Ni/Co)n | 1.3 | 1.5 | Cu | 3 | FeCo | 2.35 | 6 | Cu | 0.3 | Fe | 2.2 | 4 | 4.6 |
| 11 | 677 | Ni | 0.49 | 3 | NiAl | 3 | FeCo | 2.35 | 6 | Cu | 0.2 | FeCo | 2.35 | 5 | 4.6 |
| 12 | 357 | (Ni/Co)n | 1.3 | 1.5 | Cu | 3 | FeCo | 2.35 | 6 | Cu | 0.2 | FeCo | 2.35 | 5 | 4.5 |
| 13 | 332 | Ni | 0.49 | 2.5 | Cu | 3 | FeCo | 2.35 | 6 | NiA | 0.7 | Co | 1.8 | 4 | 4.4 |
| 15 | 772 | Ni | 0.49 | 3 | Cu | 3 | FeCo | 2.35 | 6 | Cu | 0.5 | Co | 1.8 | 4 | 4.3 |
| 14 | 732 | Ni | 0.49 | 3 | Cu | 3 | FeCo | 2.35 | 6 | Cu | 0.3 | Co | 1.8 | 4 | 4.3 |
| 16 | 685 | Ni | 0.49 | 3 | Cu | 3 | FeCo | 2.35 | 6 | Cu | 0.2 | Fe | 2.2 | 5 | 4.3 |
| 17 | 715 | Ni | 0.49 | 3 | Cu | 3 | FeCo | 2.35 | 6 | NiA | 0.3 | FeCo | 2.35 | 3 | 4.3 |
| 18 | 755 | Ni | 0.49 | 3 | Cu | 3 | FeCo | 2.35 | 6 | Cu | 0.5 | FeCo | 2.35 | 3 | 4.3 |
| 19 | 412 | (Ni/Co)n | 1.3 | 1.5 | Cu | 3 | FeCo | 2.35 | 6 | Cu | 0.3 | Co | 1.8 | 4 | 4.2 |
| 20 | 452 | (Ni/Co)n | 1.3 | 1.5 | NiAl | 3 | FeCo | 2.35 | 6 | NiA | 0.5 | Co | 1.8 | 4 | 4.2 |
| 21 | 492 | (Ni/Co)n | 1.3 | 1.5 | Cu | 3 | FeCo | 2.35 | 6 | Cu | 0.7 | Co | 1.8 | 4 | 4.2 |
| 22 | 723 | Ni | 0.49 | 3 | Cu | 3 | FeCo | 2.35 | 6 | Cu | 0.3 | Fe | 2.2 | 3 | 4.2 |
| 23 | 763 | Ni | 0.49 | 3 | Cu | 3 | FeCo | 2.35 | 6 | Cu | 0.5 | Fe | 2.2 | 3 | 4.2 |
| 24 | 365 | (Ni/Co)n | 1.3 | 1.5 | Cu | 3 | FeCo | 2.35 | 6 | NiA | 0.2 | Fe | 2.2 | 5 | 4.2 |
| 25 | 395 | (Ni/Co)n | 1.3 | 1.5 | Cu | 3 | FeCo | 2.35 | 6 | Cu | 0.3 | FeCo | 2.35 | 3 | 4.2 |
| 26 | 435 | (Ni/Co)n | 1.3 | 1.5 | Cu | 3 | FeCo | 2.35 | 6 | Cu | 0.5 | FeCo | 2.35 | 3 | 4.2 |
| 27 | 260 | Ni | 0.49 | 2.5 | NiAl | 3 | FeCo | 2.35 | 6 | Cu | 0.3 | (Co/Ni)n | 1.6 | 4 | 4.2 |
| 28 | 340 | Ni | 0.49 | 2.5 | Cu | 3 | FeCo | 2.35 | 6 | NiA | 0.7 | (Co/Ni)n | 1.6 | 4 | 4.2 |
| 29 | 676 | Ni | 0.49 | 3 | Cu | 3 | FeCo | 2.35 | 6 | Cu | 0.2 | FeCo | 2.35 | 4 | 4.1 |
| 30 | 612 | (Co/Ni)n | 1.6 | 1.5 | Cu | 3 | FeCo | 2.35 | 6 | Cu | 0.5 | Co | 1.8 | 4 | 4.1 |
| 31 | 572 | (Co/Ni)n | 1.6 | 1.5 | Cu | 3 | FeCo | 2.35 | 6 | NiA | 0.3 | Co | 1.8 | 4 | 4.1 |
| 33 | 443 | (Ni/Co)n | 1.3 | 1.5 | Cu | 3 | FeCo | 2.35 | 6 | Cu | 0.5 | Fe | 2.2 | 3 | 4.1 |
| 32 | 403 | (Ni/Co)n | 1.3 | 1.5 | Cu | 3 | FeCo | 2.35 | 6 | NiA | 0.3 | Fe | 2.2 | 3 | 4.1 |
| 34 | 740 | Ni | 0.49 | 3 | NiAl | 3 | FeCo | 2.35 | 6 | Cu | 0.3 | (Co/Ni)n | 1.6 | 4 | 4.1 |
| 35 | 780 | Ni | 0.49 | 3 | Cu | 3 | FeCo | 2.35 | 6 | Cu | 0.5 | (Co/Ni)n | 1.6 | 4 | 4.1 |
| 36 | 820 | Ni | 0.49 | 3 | Cu | 3 | FeCo | 2.35 | 6 | Cu | 0.7 | (Co/Ni)n | 1.6 | 4 | 4.1 |
| 37 | 356 | (Ni/Co)n | 1.3 | 1.5 | Cu | 3 | FeCo | 2.35 | 6 | NiA | 0.2 | FeCo | 2.35 | 4 | 4.0 |
| 38 | 603 | (Co/Ni)n | 1.6 | 1.5 | Cu | 3 | FeCo | 2.35 | 6 | NiA | 0.5 | Fe | 2.2 | 3 | 4.0 |
| 39 | 563 | (Co/Ni)n | 1.6 | 1.5 | Cu | 3 | FeCo | 2.35 | 6 | NiA | 0.3 | Co | 1.8 | 3 | 4.0 |
| 41 | 291 | Ni | 0.49 | 2.5 | Cu | 3 | FeCo | 2.35 | 6 | Cu | 0.5 | Co | 1.8 | 3 | 4.0 |
| 42 | 420 | (Ni/Co)n | 1.3 | 1.5 | Cu | 3 | FeCo | 2.35 | 6 | Cu | 0.3 | (Co/Ni)n | 1.6 | 4 | 4.0 |
| 43 | 460 | (Ni/Co)n | 1.3 | 1.5 | NiAl | 3 | FeCo | 2.35 | 6 | Cu | 0.5 | (Co/Ni)n | 1.6 | 4 | 4.0 |
| 44 | 500 | (Ni/Co)n | 1.3 | 1.5 | Cu | 3 | FeCo | 2.35 | 6 | NiA | 0.7 | (Co/Ni)n | 1.6 | 4 | 4.0 |
| 45 | 684 | Ni | 0.49 | 3 | Cu | 3 | FeCo | 2.35 | 6 | Cu | 0.2 | Fe | 2.2 | 4 | 4.0 |

*Fig. 23*

EXTENDED SPIN TORQUE OSCILLATOR

BACKGROUND OF THE INVENTION

1. Field of the Invention

Embodiments disclosed herein generally relate to magnetic recording, and in particular, relates to a high-frequency oscillator for use in a recording method that magnetically records by simultaneously irradiating a high-frequency magnetic field in addition to a write magnetic field to induce magnetic resonance in a recording medium, specifically, to a microwave-assisted recording technology, a magnetic head installed with this element, and a magnetic recording device.

2. Description of the Related Art

Accompanying recent advances in the performance of computers and faster, higher capacity networks, the amount of information transmitted in the form of digital data has jumped dramatically. In order to efficiently receive, distribute, and extract these huge amounts of information, storage devices capable of high-speed input and output of huge amounts of information are needed. As high-density recording in magnetic disks has progressed, the gradual degradation of the recorded signals by thermal fluctuations has become a tangible problem. The cause is the reduction in the volumes of the crystal particles, as the magnetic recording medium is a collection of magnetocrystalline particles. To obtain satisfactory resistance to thermal fluctuations and stability, it is believed that the often used thermal fluctuation index $K\beta$ ($K\beta = KuV/kT$; Ku: magnetic anisotropy, V: particle volume, T: absolute temperature, k: Boltzmann's constant) must be at least 70. If Ku and T (materials and environment) are constant, magnetic reversals caused by thermal fluctuations easily occur for particles having a smaller V. As high-density recording advances and the volume of the recording film occupied by one bit decreases, V must be reduced, and thermal fluctuations can no longer be ignored. If Ku is increased to suppress these thermal fluctuations, the magnetic field for reversing magnetization needed in magnetic recording exceeds the recording magnetic field that can be generated by the recording head, and recording becomes impossible.

One technique to avoid this problem is with Microwave-Assisted Magnetic Recording (MAMR). As shown by a MAMR head 100 in FIG. 1, by applying a high-frequency magnetic field generated by a spin torque oscillator (STO) 102 provided adjacent to an opposite magnetic pole 106 and a main magnetic pole 104, as well as a write magnetic field from the main magnetic pole of the vertical magnetic recording head to a magnetic recording medium 108 having high magnetic anisotropy, MAMR sets the area to be recorded in the magnetic resonance state and varies the magnetization in order to lower the magnetic field for magnetization reversal and record. Recording becomes possible in an area irradiated by microwaves in a magnetic recording medium suited for high-density recording exceeding 1 Tbit/in$^2$, which is difficult to record when using a conventional magnetic head that has an inadequate recording magnetic field. MAMR obtains a large assist effect as the high-frequency magnetic field intensity becomes stronger, as it is a magnetic recording technique that induces magnetic resonance in the recording medium 108 and achieves magnetization reversal by using the write magnetic field and the high-frequency magnetic field, and is expected to be capable of recording high-Ku media suited for high recording densities.

When an STO 102 is used in an MAMR head 100, the high-frequency magnetic field is generated by alternating the input of magnetic charge on the surface of the magnetic field generating layer (FGL) 110 that reverses magnetization in the surface of the stacked layers due to spin torque actions. The method of antiferromagnetic (AF) mode oscillation, like the STO 102 of FIG. 1, holds the FGL 110 magnetization and the reference layer (RL) 112 magnetization in the anti-parallel state and rotates the magnetizations by the spin torque actions generated by electrical conduction in the high-frequency field generating layer 110 and reference layer 112 separated by non-magnetic spin conducting material 114, such as Cu, and enters the oscillation state, as shown in FIG. 2. The principle behind AF mode oscillation uses the fact that when the spin torque magnetic field $H_{stq\text{-}FGL}$ applied to the magnetization $m_{FGL}$ of the FGL 110 and the spin torque magnetic field $H_{stq\text{-}RF}$ applied to the magnetization $m_{RL}$ of the reference layer 112 are in the same direction, their magnitudes usually differ. Regarding FIG. 2, the relationship of $H_{stq\text{-}RF}$ and $H_{stq\text{-}FGL}$ is:

$$H_{stq\text{-}ref} = (m_{FGL} \times m_{RL}) \frac{CJ}{(B_s t)_{RL}} g_{AF} \qquad \text{Equation 1}$$

$$H_{stq\text{-}FGL} = (m_{FGL} \times m_{RL}) \frac{CJ}{(B_s t)_{FGL}} g_{AF} \qquad \text{Equation 2}$$

where: $m_{FGL}$ and $m_{RL}$ represent the unit magnetization vectors of FGL 110 and RL 112, respectively, $(B_s t)_{FGL}$ and $(B_s t)_{RL}$ represent the products of the fitness thickness and the saturated magnetization of FGL 110 and RL 112, respectively, and J is the current density in the direction perpendicular to the stacked layer surface of the STO 102. The g-factor is a variable that depends on the polarizability P and the angle of magnetization, and is denoted by $g_{AJ}$ because in AF mode oscillation, FGL 110 and RL 112 are nearly anti-parallel. If $(B_s t)_{FGL} > (B_s t)_{RL}$ is designed, then $H_{stq\text{-}FGL} < H_{stq\text{-}RF}$, and the movement of the magnetization of the tracking FGL 110 is delayed and cannot track the escaping RL 112 magnetization. However, if the spin torque magnetic field depends on the outer product of $m_{FGL}$ and $m_{RL}$, the action disappears when the anti-parallel state is reached. Consequently, while the FGL 110 magnetization and the RL 112 magnetization are held in the near anti-parallel state, the periphery of the applied magnetic field continuously rotates. An advantage is that a large spin torque effect is extracted at a relatively small current because the g-factor becomes extremely large ($g_{AF} \gg g$) when the FGL 110 magnetization and the RL 112 magnetization enter the anti-parallel state.

In a prototype MAMR head with STO 300, FGL 310, RL 312, and non-magnetic spin conducting material 314, even for a thicker FGL film 310 with the objective of obtaining a stronger high-frequency magnetic field, the assist effect did not improve when some thickness was exceeded. As a result of detailed studies of the oscillation characteristics of the STO 300 by micro-magnetic simulation, the cause was determined to be the generation of a prominent domain having a magnetization component perpendicular to the film surface when the FGL 310 film thickened and some film thickness was exceeded. The magnetization emitted at the FGL-side 310 surface did not increase as the film thickness of the stacked layers increased, as shown by FIG. 3, and part of the FGL 310 turned into a dead layer 316. The reason is believed to be the exchange interaction in the film thickness direction, and easy magnetization perpendicular to the film surface.

Therefore, there is a need in the art for an MAMR magnetic recording head having a large assist effect by using an STO having a structure that obtains a strong high-frequency magnetic field, and a hard disk drive that uses this head.

SUMMARY OF THE INVENTION

The present disclosure generally relates to a high-frequency oscillator for use in a recording device having a microwave-assisted magnetic recording head. The microwave-assisted magnetic recording head achieves a large assist effect by using an extended spin torque oscillator disposed between a main magnetic pole and a pole opposite the main magnetic pole. The spin torque oscillator obtains a strong high-frequency magnetic field and comprises a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. The spin torque oscillator has a drive current flowing though in the direction from the first magnetic field generating layer to the reference layer.

In one embodiment, a microwave-assisted magnetic recording head comprises a main magnetic pole, a pole opposite the main magnetic pole, and a spin torque oscillator. The spin torque oscillator is disposed between the main magnetic pole and the magnetic pole opposite the main magnetic pole, and is comprised of: a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. The first magnetic field generating layer is thicker than the second magnetic field generating layer, and a drive current flows in the direction from the first magnetic field generating layer to the reference layer.

In another embodiment, a microwave-assisted magnetic recording head comprises a main magnetic pole, a pole opposite the main magnetic pole, and a spin torque oscillator. The spin torque is oscillator disposed between the main magnetic pole and the magnetic pole opposite the main magnetic pole. The spin torque oscillator comprises in order from the main magnetic pole to the magnetic pole opposite the main magnetic pole: a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. A drive current flows in the direction from the pole opposite the main magnetic pole to the main magnetic pole. Of the layers of the spin torque oscillator, the first magnetic field generating layer is the thickest layer and the second non-magnetic spin transfer layer is the thinnest layer.

In another embodiment, a hard disk drive comprises a rotary actuator, an arm, a magnetic head slider, a recording and playback unit disposed on the magnetic head slider, a microwave-assisted magnetic recording head, a main magnetic pole disposed on the recording and playback unit, a magnetic pole opposite the main magnetic pole disposed on the recording and playback unit, and a spin torque oscillator disposed between the main magnetic pole and the magnetic pole opposite the main magnetic pole. The spin torque oscillator is comprised of: a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. A drive current flows in the direction from the first magnetic field generating layer to the reference layer, and the first magnetic field generating layer is thicker than the second magnetic field generating layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 23 illustrates a table showing the top 45 structural conditions and effects of a magnetic recording head according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure generally relates to a high-frequency oscillator for use in a recording device having a microwave-assisted magnetic recording head. The microwave-assisted magnetic recording head achieves a large assist effect by using an extended spin torque oscillator disposed between a main magnetic pole and a pole opposite the main magnetic pole. The spin torque oscillator obtains a strong high-frequency magnetic field and comprises a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer. The spin torque oscillator has a drive current flowing though in the direction from the first magnetic field generating layer to the reference layer.

To limit magnetization in the direction of the film thickness of the FGL to suppress the generation of a high-frequency magnetic field, it is considered to be effective to divide the FGL in the direction of the film thickness to weaken the exchange interaction between the FGLs compared to the exchange interaction in the in-plane direction.

Figure 1:
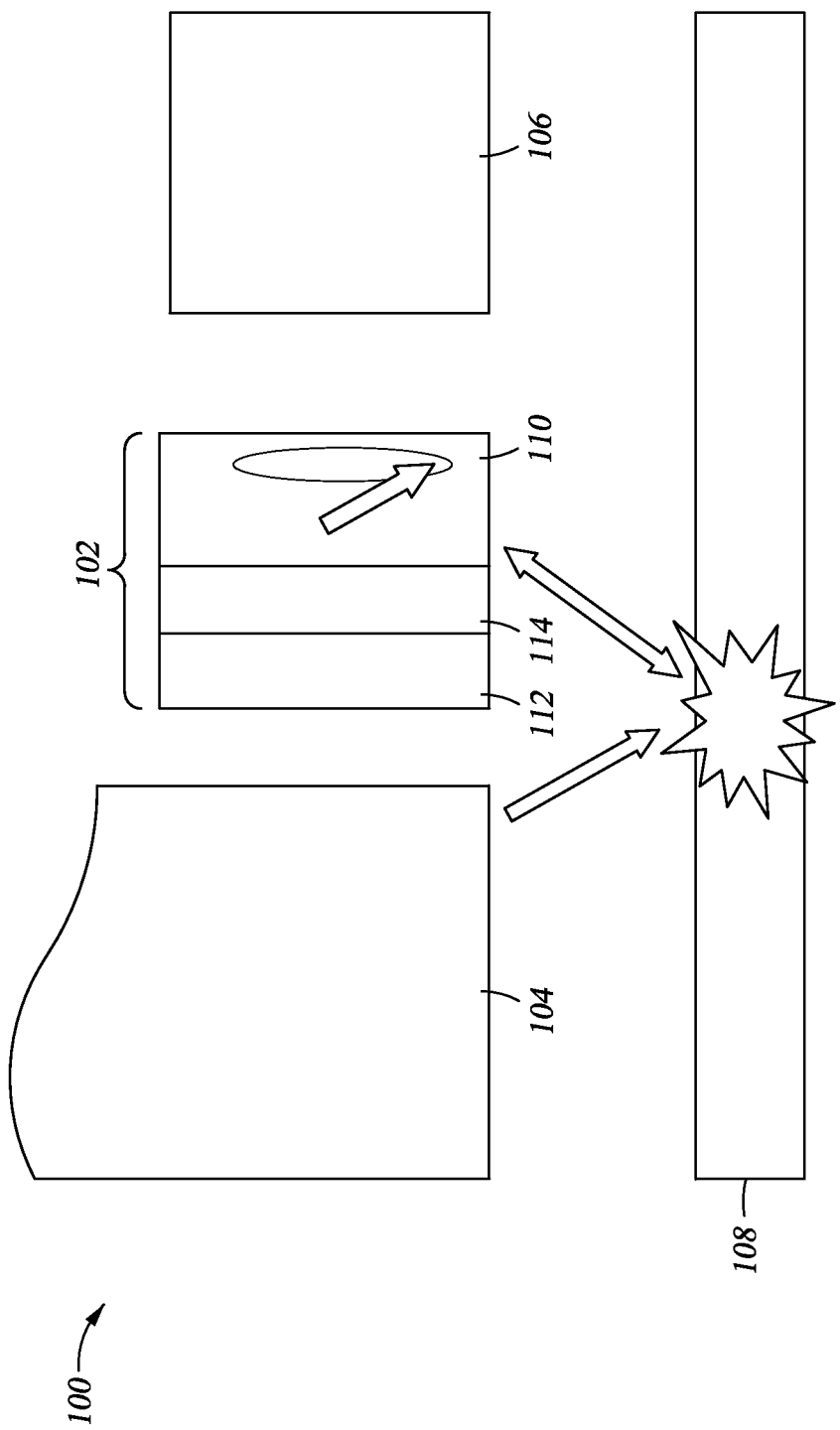
FIG. 1 shows the general structure of microwave-assisted recording.
Figure 2:
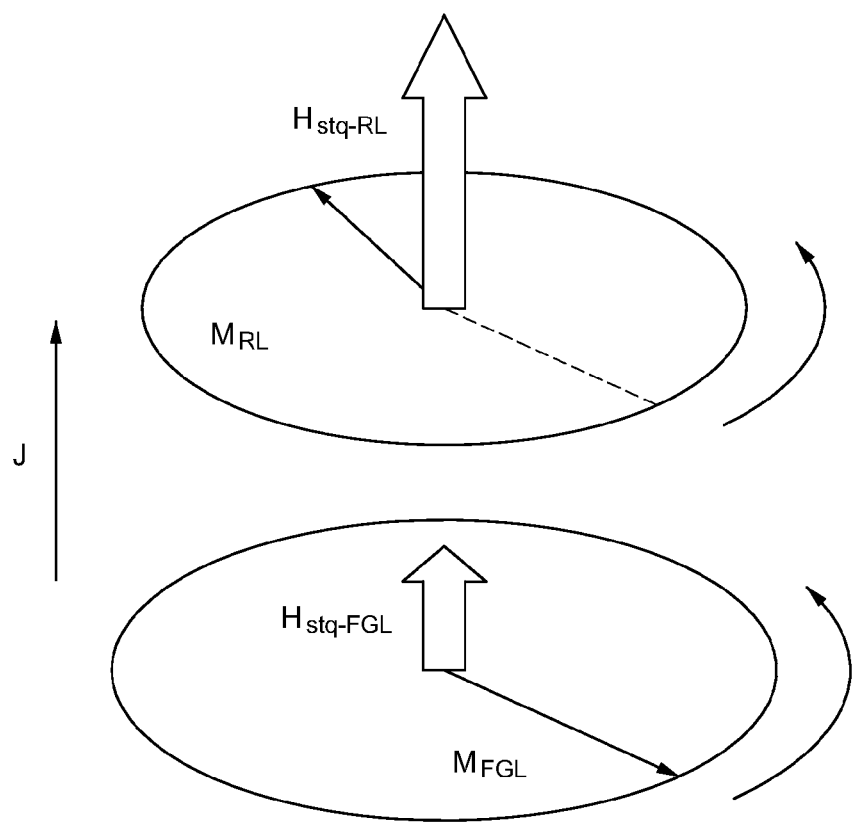
FIG. 2 shows the operating principle of a conventional STO structure.
Figure 3:
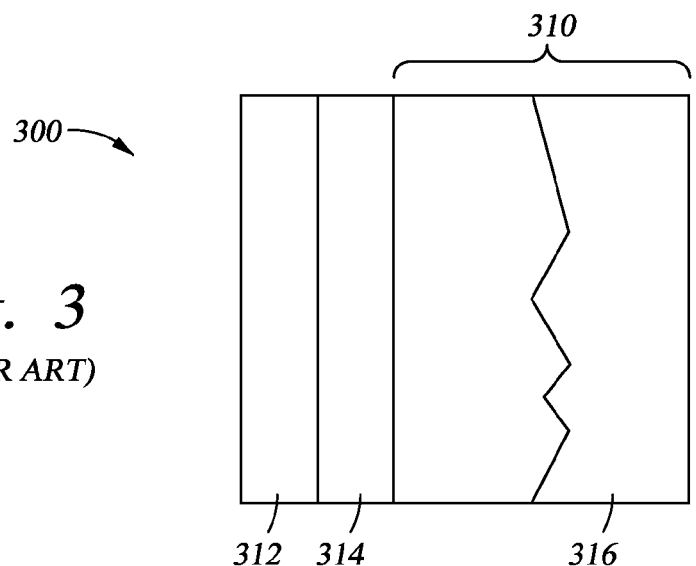
FIG. 3 shows the problems of a conventional STO structure.
Figure 4:
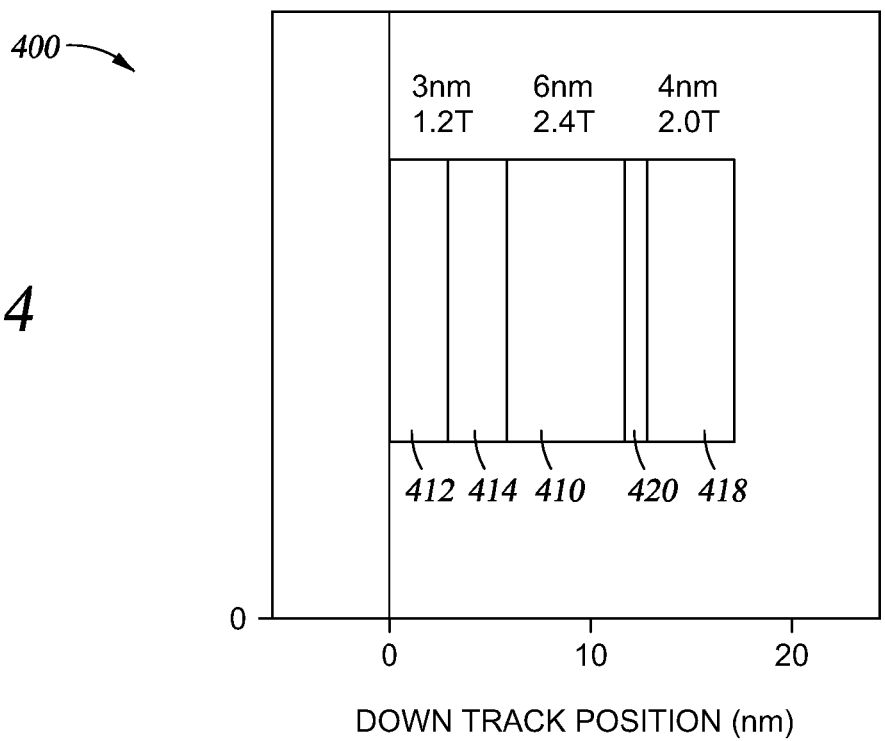
FIG. 4 illustrates an extended STO structure according to one embodiment.
Figure 5:
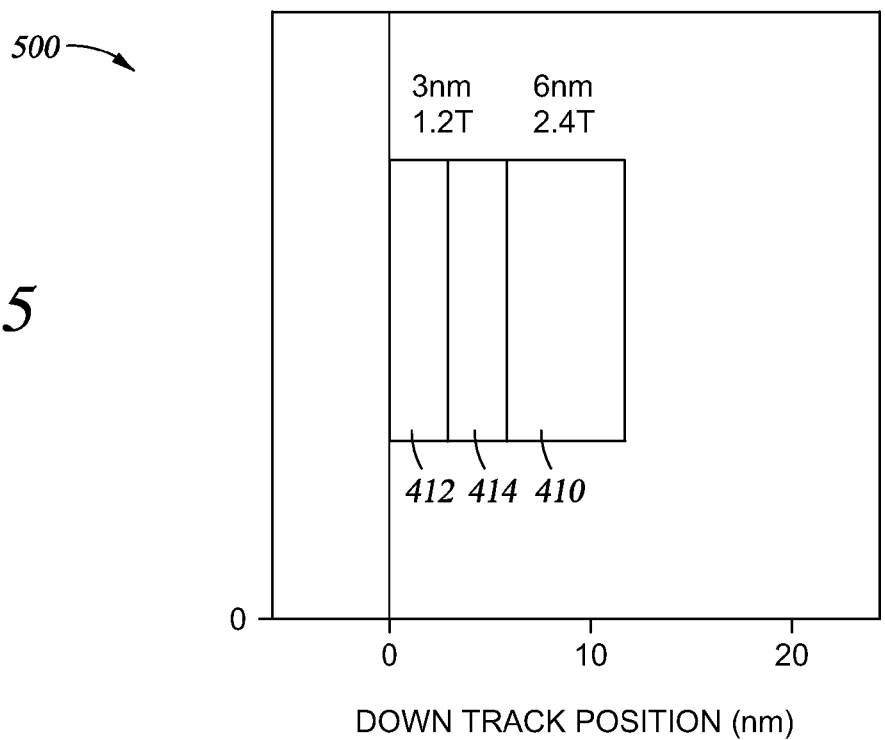
FIG. 5 illustrates a conventional STO structure.

As shown in FIG. 4, the distribution in the down track direction of the effective high-frequency magnetic field $H_{hf\text{-}eff}$ at the recording medium is examined for an extended STO structure 400 when a 4 nm FGL 418 having a saturated magnetization of 2.0 T is extended to the outside of FGL 410, and the magnetizations of FGL 410 and FGL 418 become parallel. STO 400 also comprises a first non-magnetic spin transfer layer 414 and a second non-magnetic spin transfer layer 420. As a comparative example, FIG. 5 shows the effective high-frequency magnetic field of a conventional STO structure 500, which is not provided with a second FGL 418, is also determined. The conventional STO 500 of FIG. 5 has the same FGL 410, RL 412, and first non-magnetic spin transfer layer 414 of the extended STO 400 of FIG. 4.

Figure 6:
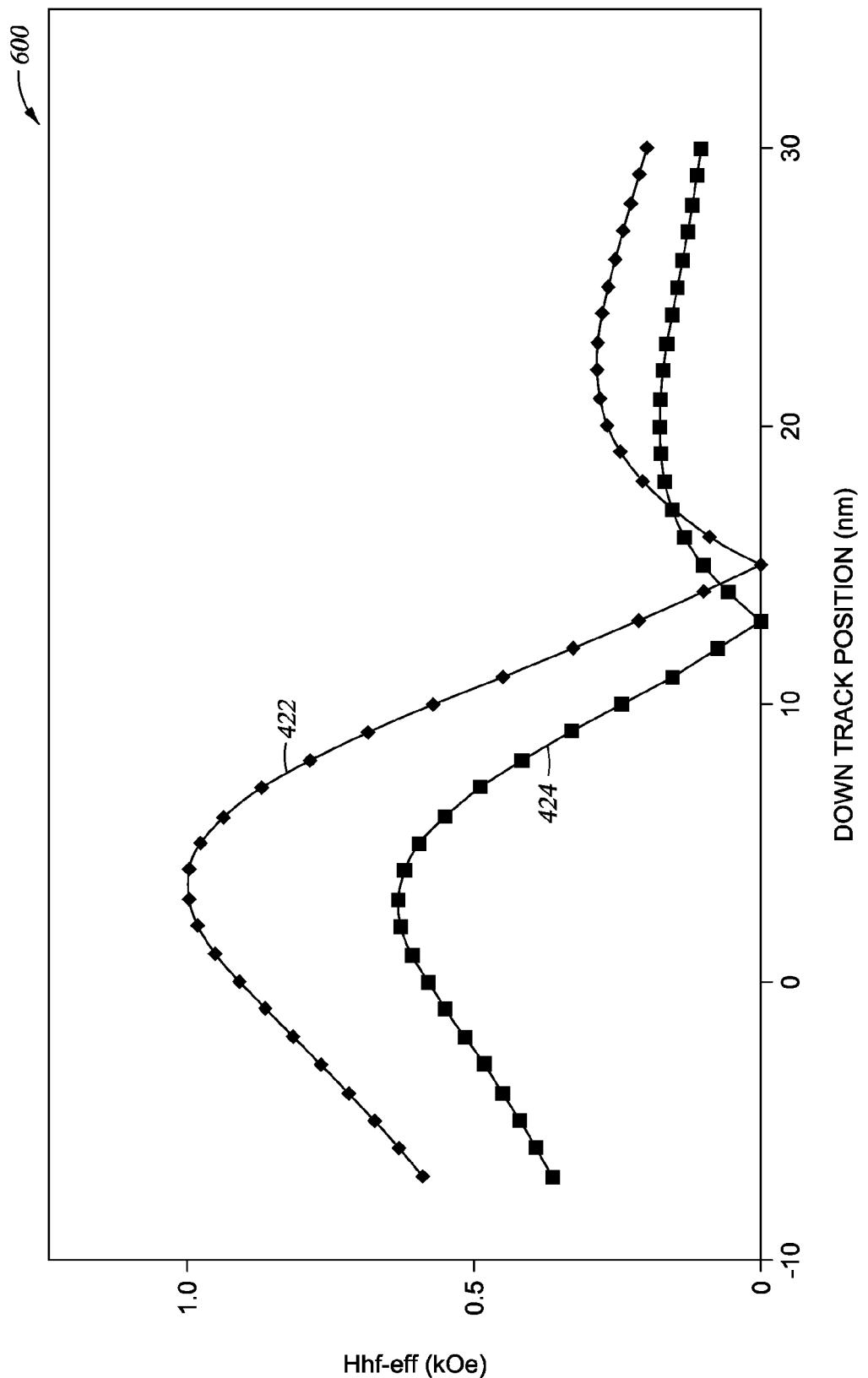
FIG. 6 shows the effective high-frequency magnetic field distribution of a conventional STO structure and an extended STO structure.

FIG. 6 is a graph 600 showing the distributions of the effective high-frequency magnetic field calculated by considering the effective high-frequency magnetic field to be the component in the direction of rotation of the precession motion of the medium's magnetization that is rotating (recording) in the high-frequency magnetic fields generated by the STOs. Line 422 represents the extended STO structure 400 of FIG. 4, and line 424 represents the conventional STO structure 500 of FIG. 5. From graph 600, it is clear that by providing the 4 nm FGL 418 extension, the effective high-frequency magnetic field obtained is at least 1.5 times that of STO 500 having the conventional structure.

Figure 7:
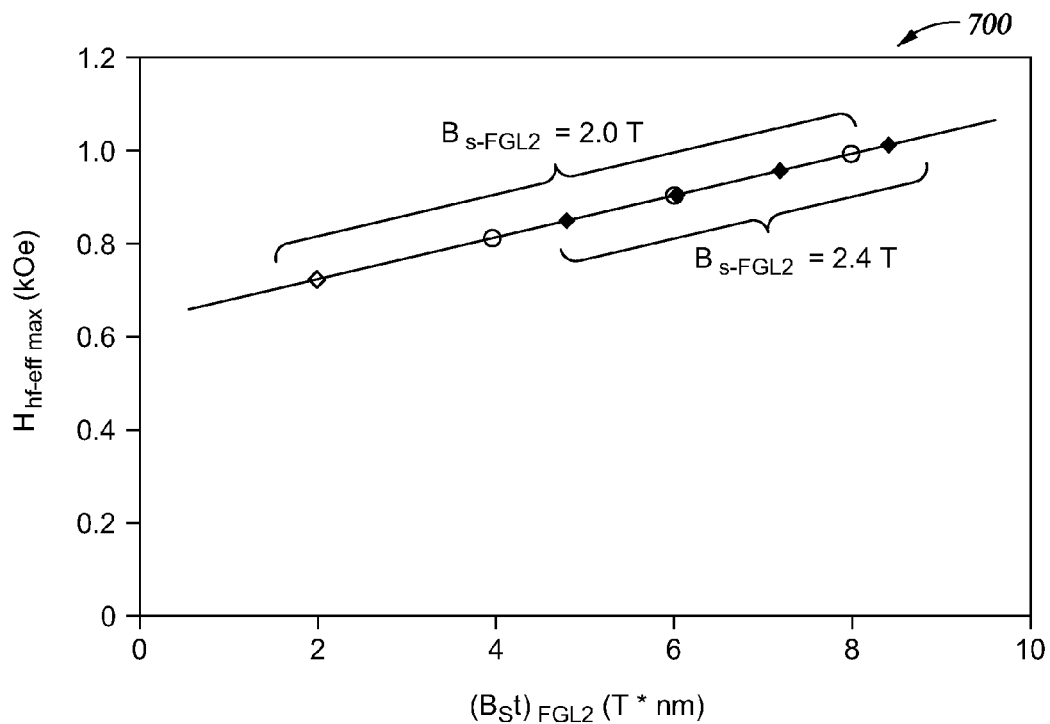
FIG. 7 illustrates a graph showing the saturated magnetization and thickness dependence of the second FGL of the maximum effective high-frequency magnetic field.

FIG. 7 is a graph 700 showing the maximum value $H_{hf\text{-}eff\_max}$ of the effective high-frequency magnetic field distribution obtained by varying the saturated magnetization and the thickness of FGL 418 as a function of the product $(B_s t)_{FGL2}$ of the saturated magnetization and the thickness of FGL 418, based on the STO 400 of FIG. 4. The drawing shows that $H_{hf\text{-}eff}$ is represented as a function of $(B_s t)_{FGL2}$ and is independent of the magnitude of the saturated magnetization of FGL 418. Consequently, to obtain a stronger effective high-frequency magnetic field, stacked layers of thicker materials having the largest possible saturated magnetization are preferred.

Figure 8:
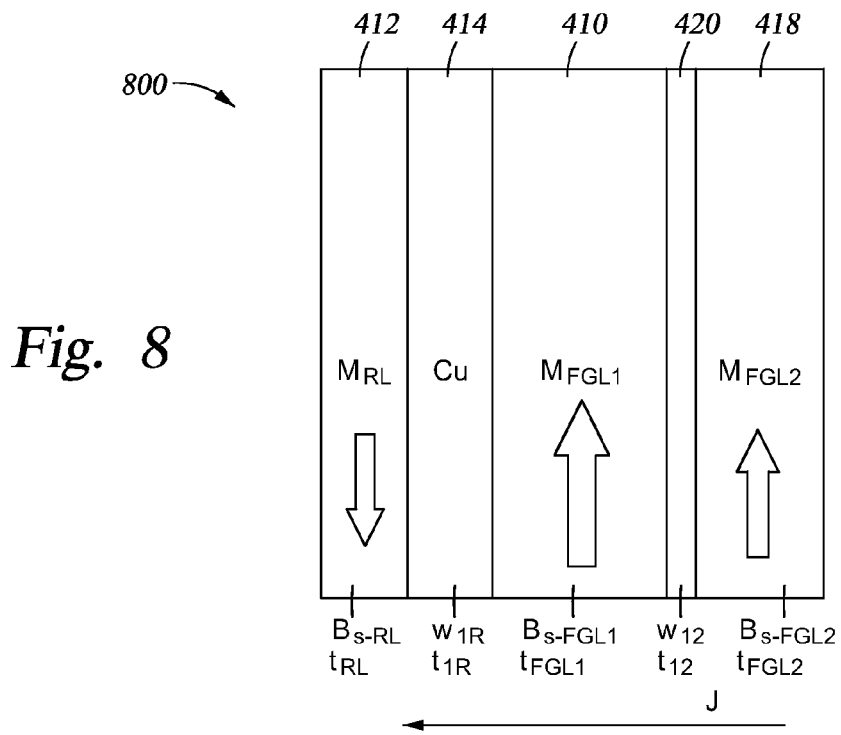
FIG. 8 shows the important calculation parameters and an extended STO structure.

However, if the divided FGL magnetization is unified, maintains the parallel state, and does not rotate or oscillate, the preferred strong high-frequency magnetic field is not obtained. Therefore, the following Landau-Lifshitz-Gilbert (LLG) equation is used to examine the conditions in which the divided FGL maintains the parallel state and oscillates, as shown in FIG. 8. FIG. 8 shows an extended STO structure 800, using $$\frac{dm_{FGL2}}{dt} = -\gamma m_{FGL2} \times H_{FGL2} + \alpha_{FGL2} m_{FGL2} \times \frac{dm_{FGL2}}{dt} - \gamma \beta_{2-12} J \cdot m_{FGL2} \times (m_{FGL2} \times m_{FGL1})$$

$$\frac{dm_{FGL1}}{dt} = -\gamma m_{FGL1} \times H_{FGL1} + \alpha_{FGL1} m_{FGL1} \times \frac{dm_{FGL1}}{dt} - \gamma J \cdot m_{FGL1} \times (\beta_{1-12}(m_{FGL2} \times m_{FGL1}) + \beta_{1-1R}(m_{FGL1} \times m_{RL}))$$

$$\frac{dm_{RL}}{dt} = -\gamma m_{RL} \times H_{RL} + \alpha_{RL} m_{RL} \times \frac{dm_{RL}}{dt} - \gamma \beta_{R-1R} J \cdot m_{RL} \times (m_{FGL1} \times m_{RL}),$$

$$\beta_{1-12} = \frac{\pi \mu_B}{2500 \gamma e (B_s t)_{FGL1}} g_{12},$$

$$\beta_{2-12} = \frac{\pi \mu_B}{2500 \gamma e (B_s t)_{FGL2}} g_{12},$$

$$g_{12} = \left[ -4 + \frac{(1+P)^3 (3 + m_{FGL1} \cdot m_{FGL2})}{4 P^{3/2}} \right]^{-1}$$

$$\beta_{1-1R} = \frac{\pi \mu_B}{2500 \gamma e (B_s t)_{FGL1}} g_{1R},$$

$$\beta_{R-1R} = \frac{2 \mu_B}{2500 \gamma e (B_s t)_{RL}} g_{1R},$$

$$g_{1R} = \left[ -4 + \frac{(1+P)^3 (3 + m_{FGL1} \cdot m_{RL})}{4 P^{3/2}} \right]^{-1}$$

Equation 3 where $m_{FGL2}$, $m_{FGL1}$, $m_{RL}$ are the respective unit magnetization vectors of FGL 418, FGL 410, and RL 412, $H_{FGL2}$, $H_{FGL1}$, $H_{RL}$ are the respective effective magnetic fields of FGL 418, FGL 410, and RL 412, $\alpha_{FGL2}$, $\alpha_{FGL1}$, $\alpha_{RL}$ are the respective damping constants of FGL 418, FGL 410, and RL 412, $(B_s t)_{FGL2}$, $(B_s t)_{FGL1}$, $(B_s t)_{RL}$ are the respective products of the magnetization and the film thickness of FGL 418, FGL 410, and RL 412. The effective magnetic fields are considered to be the magnetic anisotropic magnetic field, the static magnetic field, and the external magnetic field. J is the current density in the direction perpendicular to the stacked layer surface of the STO. P is the polarizability. The symbols γ, π, $\mu_B$, and e are the gyromagnetic constant, the value pi, the Bohr magneton, and the unit charge, respectively.

FIGS. 9A to 9D show the results of a study of the oscillation state of the STO 400 of FIG. 4 having a cross-sectional shape of 40 nm×40 nm when the saturated magnetization $B_{s-FGL2}$ of FGL 418 was changed (A: 1.2 T, B: 1.6 T, C: 2.0 T, D: 2.4 T). The soft magnetic body had a film thickness $t_{RL}$ of 2.5 nm and a saturated magnetization $B_{s-RL}$ of 0.6 T in the reference layer 412, and the soft magnetic body had of film thickness $t_{FGL1}$ of 6 nm and a saturated magnetization $B_{s-FGL1}$ of 2.4 T in FGL 410. The film thickness $t_{FGL2}$ of FGL 418 was fixed at 4.0 nm. The space between FGL 410 and FGL 418, $t_{12}$, and the space between FGL 410 and RL 412, $t_{1R}$, were 1.0 nm and 3.0 nm, respectively. The exchange interaction between FGL 410 and FGL 418, $w_{12}$, and the exchange interaction between FGL 410 and RL 412, $w_{1R}$, were 1.0 erg/cm² and 0 erg/cm², respectively. The damping constants of FGL 418, FGL 410, and RL 412 were 0.01, 0.05, and 0.05, respectively. Graphs 926, 930, 934, and 938 show the oscillation frequency in GHz of each layer in an external magnetic field. The oscillation frequency was found when the external magnetic field was varied slowly and continuously from −25 kOe to 25 kOe. Graphs 928, 932, 936, and 940 show the normalized in-plane magnetization of each layer at an external magnetic field of 10 kOe. The circles O indicate structures having good oscillation characteristics as the STO for microwave-assisted recording. The triangle A indicates a structure that can be used, but with caution. The X indicates a structure for which the extended STO structure is ineffective.

Figure 9A:
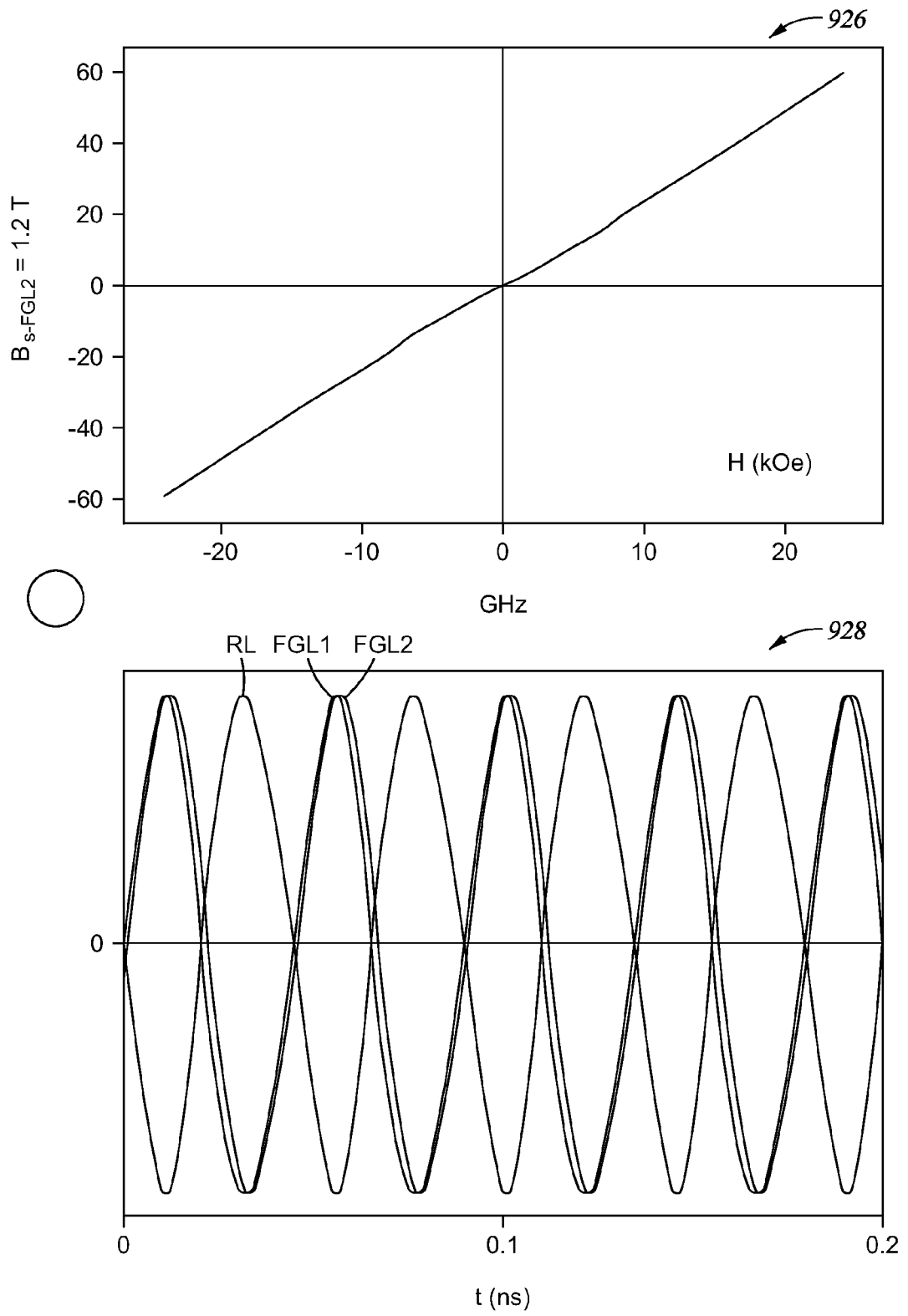
FIGS. 9A-9D show the oscillation characteristics of an extended STO structure according to one embodiment.

FIG. 9A ($B_{s-FGL2}$=1.2 T) graphs 926 and 928 show a particularly ideal oscillation state. The oscillation frequencies of FGL 418, FGL 410, and RL 412 align completely and are proportional to the external magnetic field. In addition, the normalized in-plane magnetizations oscillate nearly aligned for FGL 418 and FGL 410, and both maintain the parallel state and rotate. It is believed that the magnetization in the normalized plane of RL 412 oscillates at a phase offset by approximately 180° from FGL 418 and FGL 410, maintains the anti-parallel state of the FGL magnetizations, and rotates.

Figure 9B:
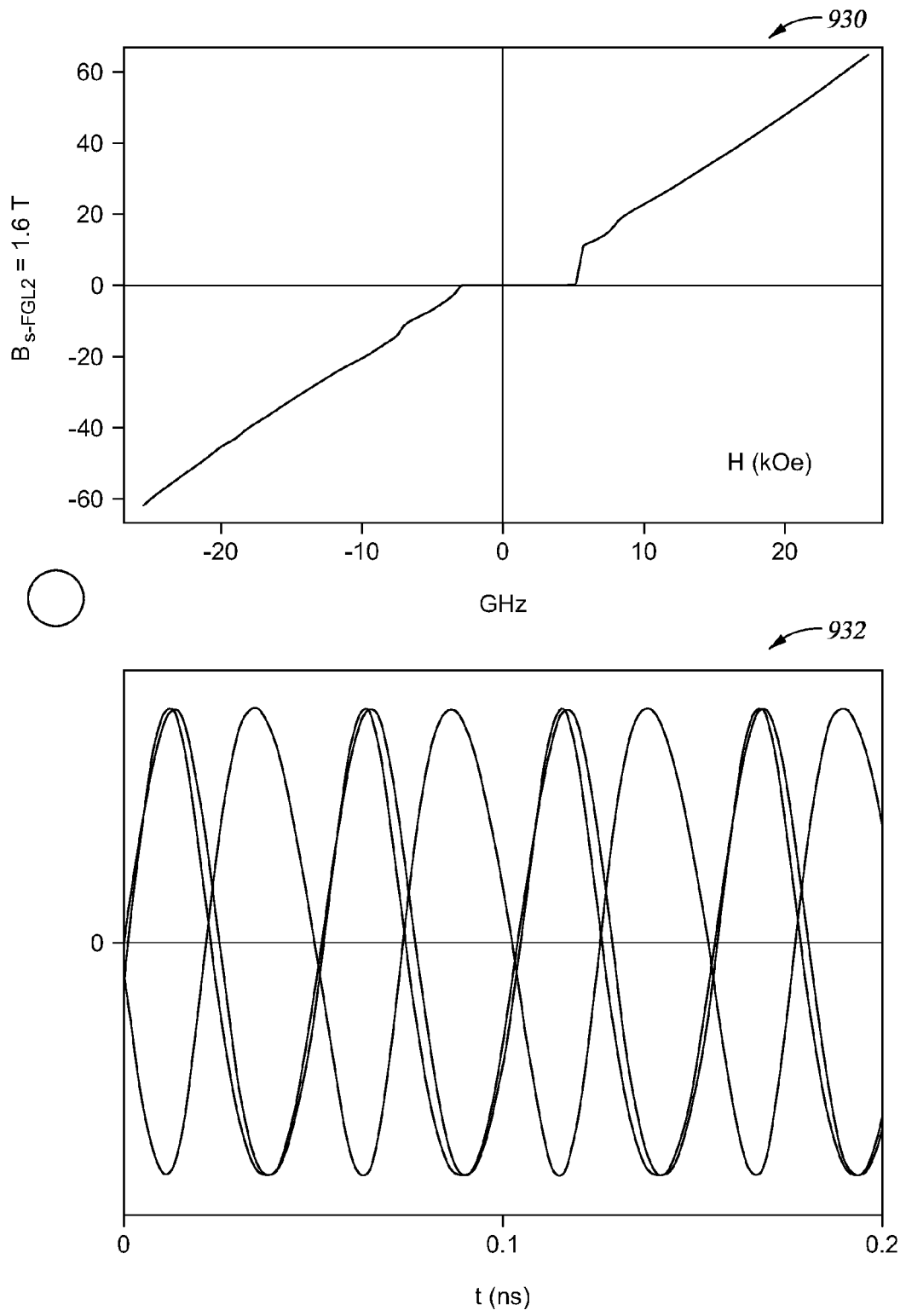

In FIG. 9B ($B_{s-FGL2}$=1.6 T), the oscillation frequencies of FGL 418, FGL 410, and RL 412 align completely, but the oscillations stop when the external magnetic field is small (−3 kOe to 5 kOe), as shown by graphs 930 and 932. At the external (gap) magnetic field of 10 kOe assumed when using only FGL 410 as the MAMR, the normalized in-plane magnetizations oscillate nearly aligned for FGL 418 and FGL 410, and both maintain the parallel state and rotate. The normalized in-plane magnetization of RL 412 oscillates offset by a phase of approximately 180° from FGL 418 and FGL 410, maintains the anti-parallel state of the FGL magnetizations, and rotates. Consequently, there are no problems when used as the STO for MAMR.

Figure 9C:
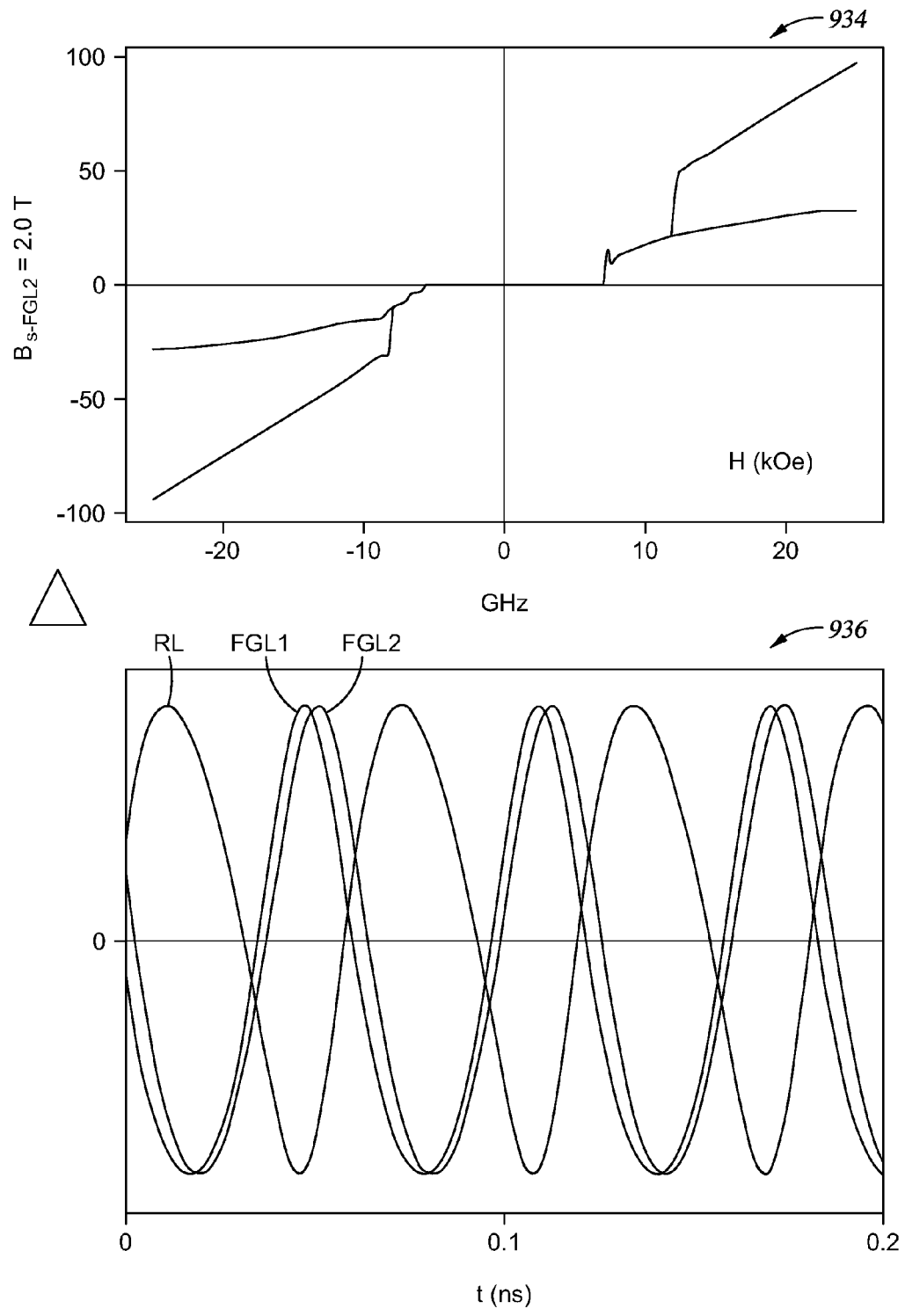

FIG. 9C, ($B_{s-FGL2}$=2.0 T), the oscillation frequencies of FGL 418, FGL 410, and RL 412 align partially, but when the external magnetic field increases, FGL 410 and RL 412 oscillate at approximately twice the frequency of FGL 418, as shown by graphs 934 and 936. At the external (gap) magnetic field of 10 kOe, the normalized in-plane magnetization oscillates nearly aligned to FGL 418 and FGL 410, and both maintain the parallel state and rotate. The normalized in-plane magnetization of RL 412 oscillates at a phase offset by approximately 180° from both FGL 418 and FGL 410, maintains the anti-parallel state of the FGL magnetizations, and rotates. Consequently, this structure can be used as the STO for MAMR, but there is concern about unstable oscillation caused by disorder in the environment.

Figure 9D:
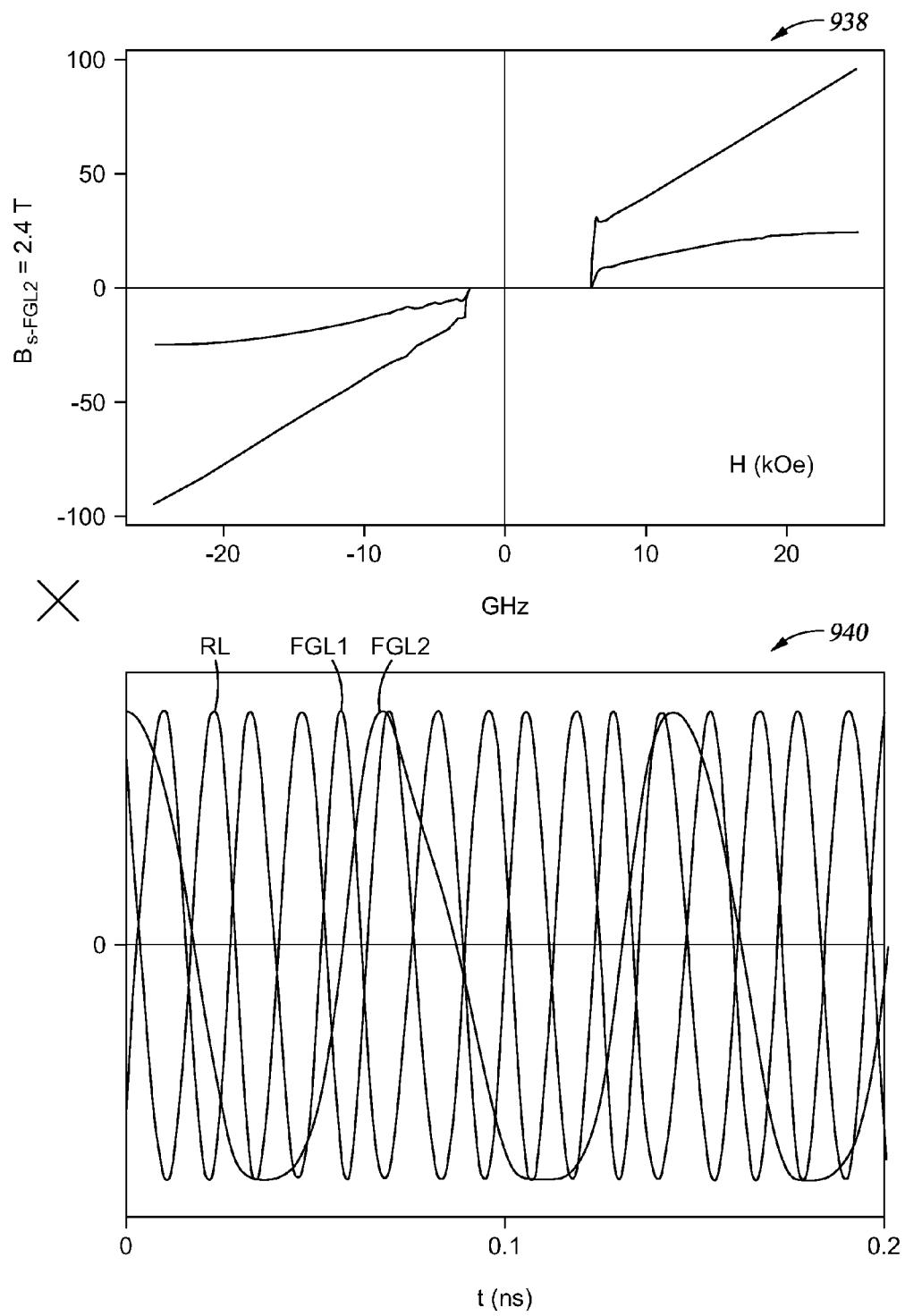

In FIG. 9D ($B_{s-FGL2}$=2.4 T), FGL 410 and RL 412 oscillate at least twice the frequency than that of FGL 418, as shown by graphs 938 and 940. The behavior of the normalized in-plane magnetizations at a 10 kOe external magnetic field is that RL 412 and FGL 410 oscillate offset by approximately 180°, and the RL 412 magnetization is not synchronized. The desired effects cannot be obtained in this structure.

FIGS. 10A to 10D show the results of an examination of the oscillation state of STO 400 of FIG. 4 having a cross-sectional shape of 40 nm×40 nm when the film thickness $t_{FGL2}$ of FGL 418 was changed (A: 2 nm, B: 3 nm, C: 4 nm, D: 5 nm). The soft magnetic body had a film thickness $t_{RL}$ of 2.5 nm and a magnetization $B_{s-RL}$ of 0.6 T in the reference layer 412, and the soft magnetic body had a film thickness $t_{FGL1}$ of 6 nm, a saturated magnetization $B_{s-FGL1}$ of 2.4 T in FGL 410 and a saturated magnetization $B_{s-FGL2}$ of 2.0 T for FGL 418. The space between FGL 410 and FGL 418, $t_{12}$, and the space between FGL 410 and RL 412, $t_{1R}$, were 1.0 nm and 3.0 nm, respectively. The exchange interaction between FGL 410 and FGL 418, $w_{12}$, and the exchange interaction between FGL 410 and RL 412, $w_{1R}$, were 1.0 erg/cm² and 0 erg/cm², respectively. The damping constants of FGL 418, FGL 410, and RL 412 were 0.01, 0.05, and 0.05, respectively. Similar to FIG. 9, graphs 1026, 1030, 1034, and 1038 show the oscillation frequency in GHz of each layer in an external magnetic field. Graphs 1028, 1032, 1036, and 1040 show the normalized in-plane magnetization of each layer. In addition, as in FIGS. 9A-9D the circles O indicate structures having good oscillation characteristics as the STO for microwave-assisted recording. The triangle A indicates a structure that can be used, but with caution. The cross X indicates a structure for which the extended STO structure is ineffective.

Figure 10A:
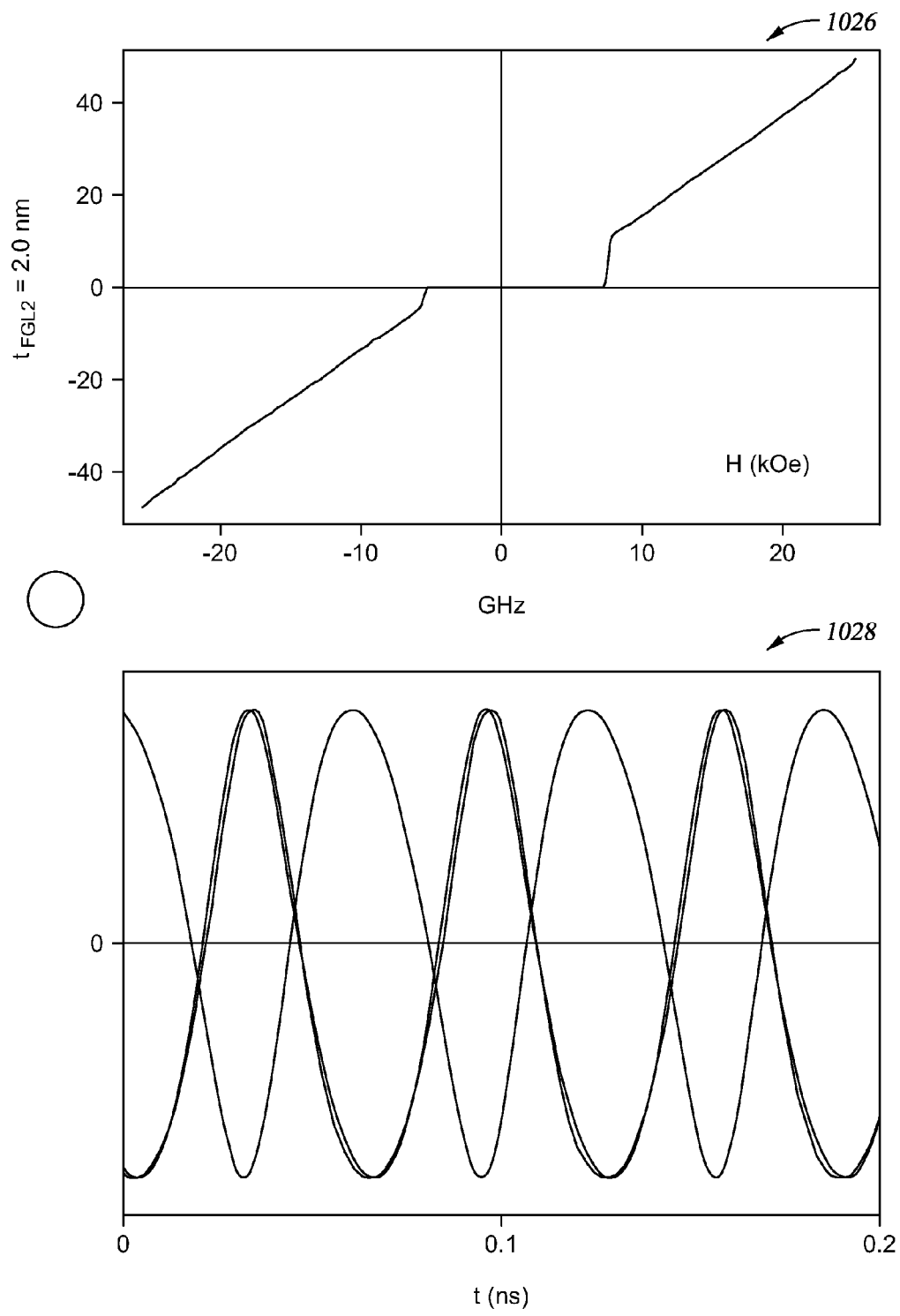
FIGS. 10A-10D show the oscillation characteristics of an extended STO structure according to one embodiment.
Figure 10B:
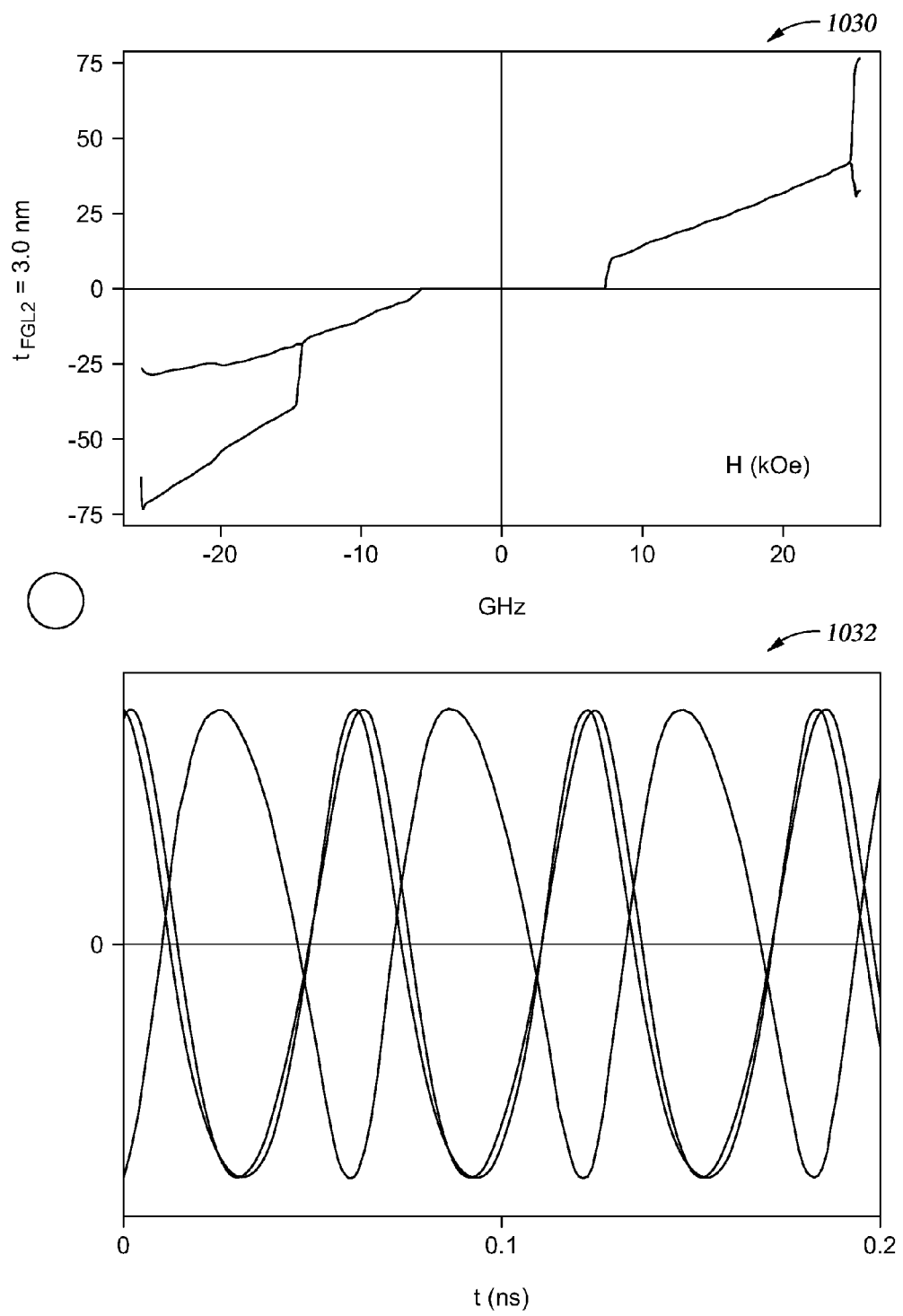

In FIGS. 10A and 10B ($t_{FGL2}$=2, 3 nm), the oscillation frequencies of FGL 418, FGL 410, and RL 412 stop oscillating at (−4 kOe to 7 kOe) when the external magnetic field is small, but the oscillation frequencies align when the oscillating external magnetic field is in the range from −15 kOe to 15 kOe, as shown by graphs 1026 and 1028, and graphs 1030 and 1032. When the external (gap) magnetic field assumed for use as MAMR is 10 kOe, the normalized in-plane magnetizations oscillate nearly aligned for FGL 418 and FGL 410, and both maintain the parallel state and rotate. The normalized in-plane magnetization of RL 412 oscillates at a phase offset by approximately 180° from FGL 418 and FGL 410, maintains the anti-parallel state of the FGL magnetizations, and rotates. Consequently, there are no problems when used as an STO for MAMR.

Figure 10C:
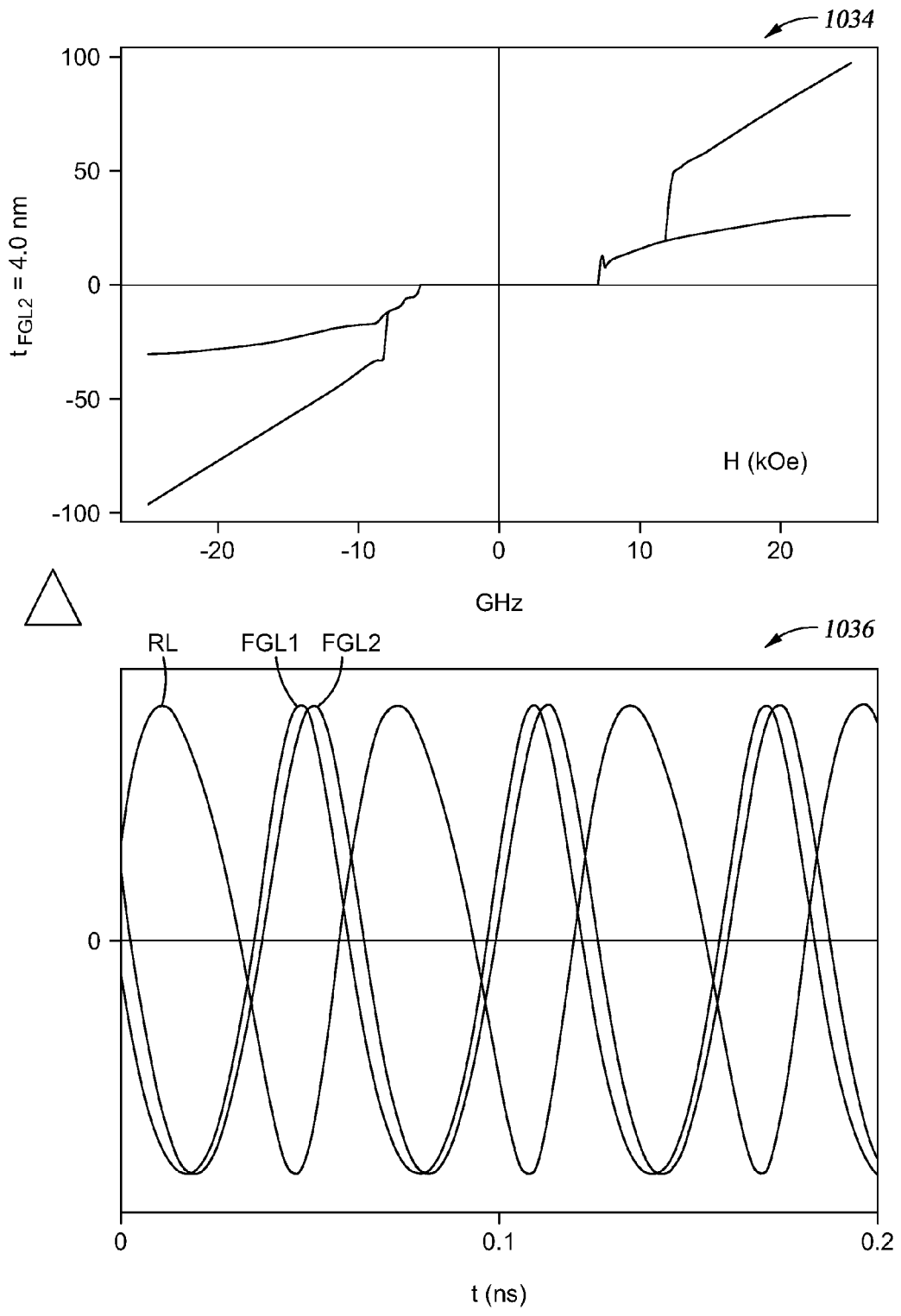

In FIG. 10C ($t_{FGL2}$=4 nm), the oscillation frequencies of FGL 418, FGL 410, and RL 412 align partially, but when the external magnetic field increases, FGL 410 and RL 412 oscillate at approximately twice the frequency of FGL 418, as shown by graphs 1034 and 1036. When the external (gap) magnetic field is 10 kOe, the normalized in-plane magnetization oscillates nearly aligned to FGL 418 and FGL 410, and both maintain the parallel state and rotate. The normalized in-plane magnetization of RL 412 oscillates at a phase offset by approximately 180° from FGL 418 and FGL 410, maintains the anti-parallel states of the FGL magnetizations, and rotates. Consequently, this structure can be used as the STO for MAMR, but there is concern about unstable oscillation caused by disorder in the environment.

Figure 10D:
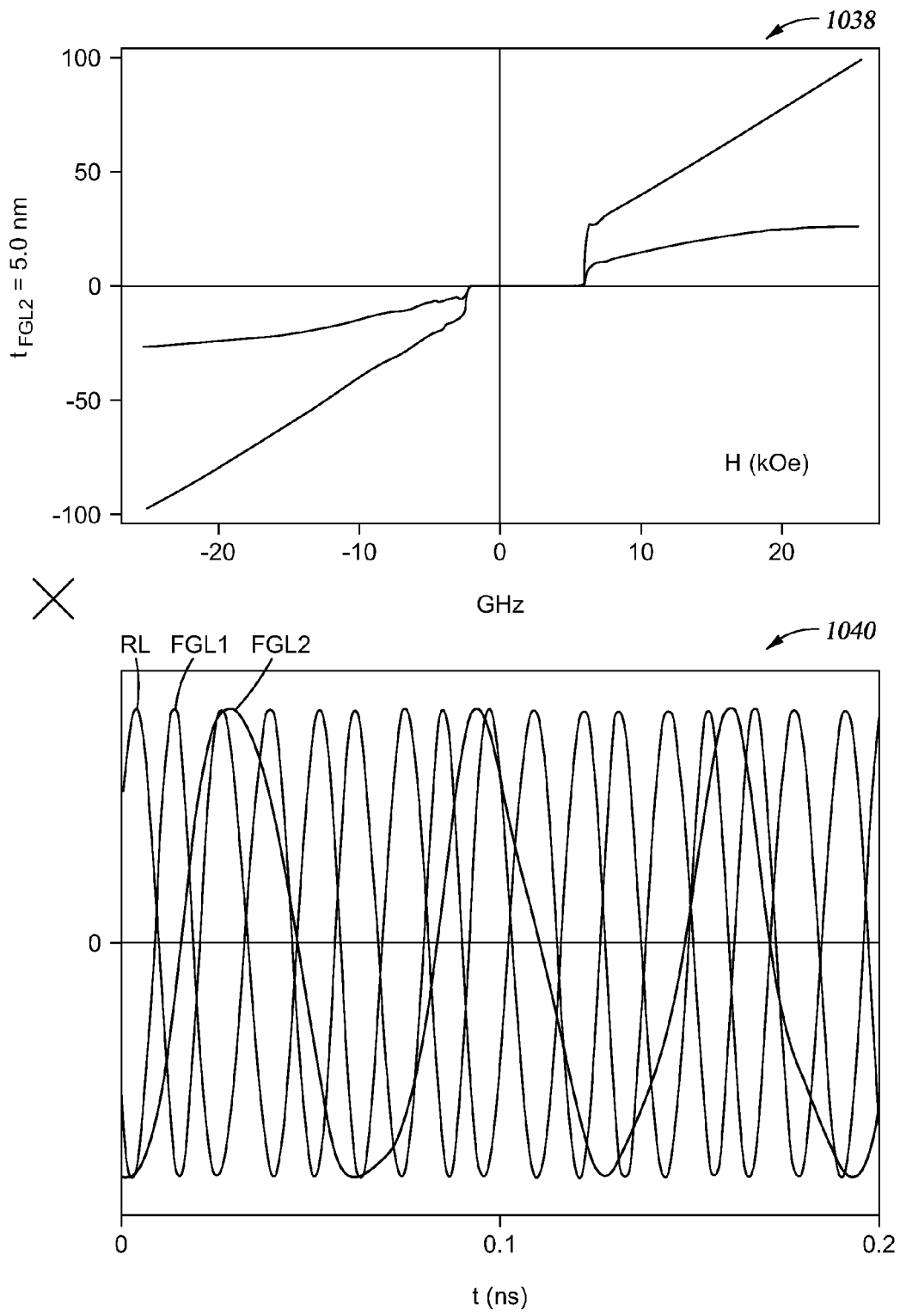

In FIG. 10D ($t_{FGL2}$=5 nm), FGL 410 and RL 412 oscillate at at least twice the frequency than that of FGL 418, as shown by graphs 1038 and 1040. The behavior of the normalized in-plane magnetizations in a 10 kOe external magnetic field is that RL 412 and FGL 410 oscillate at a phase offset by approximately 180°, and the RL 412 magnetization is not synchronized. The desired effects are not obtained in this structure.

Figure 11:
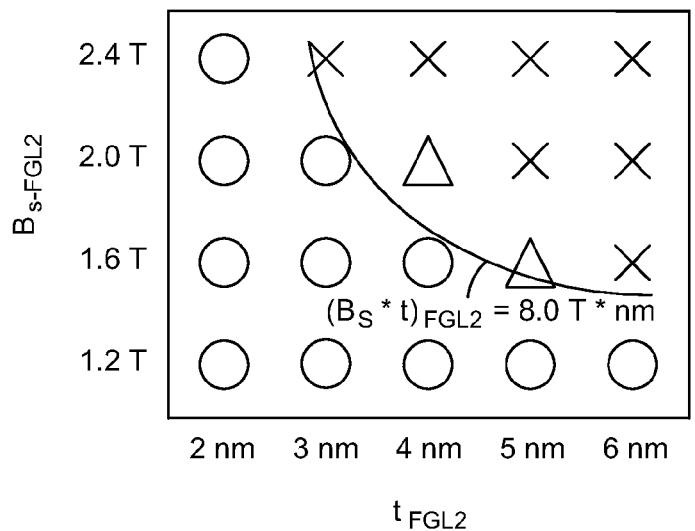
FIG. 11 illustrates a graph showing the preferred oscillation regions of an extended STO structure.

From FIGS. 9A-9D and 10A-10D, it is clear that when the saturated magnetization is too large, and when the film is too thick, the desired effects cannot be obtained. Therefore, the saturated magnetization and the film thickness of FGL 418 were changed. FIG. 11 is a graph 1100 showing the combination of good oscillation regions that obtained the desired effects of the STO 400 from FIG. 4. From FIG. 11, if the soft magnetic body has a film thickness $t_{RL}$ of 2.5 nm and a saturated magnetization $B_{s\text{-}RL}$ of 0.6 T in the reference layer 412, and the exchange interaction between FGL 410 and FGL 418, $w_{12}$, is 1.0 erg/cm$^2$, it is clear that the desired effects cannot be obtained when the $(B_s t)_{FGL2}$ of FGL 418 becomes larger than 8.0 T·nm. On the other hand, in the study in FIG. 7, $(B_s t)_{FGL2}$ of FGL 418 must be large to obtain a strong high-frequency magnetic field. Therefore, to study the structure obtained by the desired effects, the reference layer 412 or the exchange interaction between FGL 410 and FGL 418, $w_{12}$, was changed, and the respective maximum values of $(B_s t)_{FGL2}$ were determined.

Figure 12:
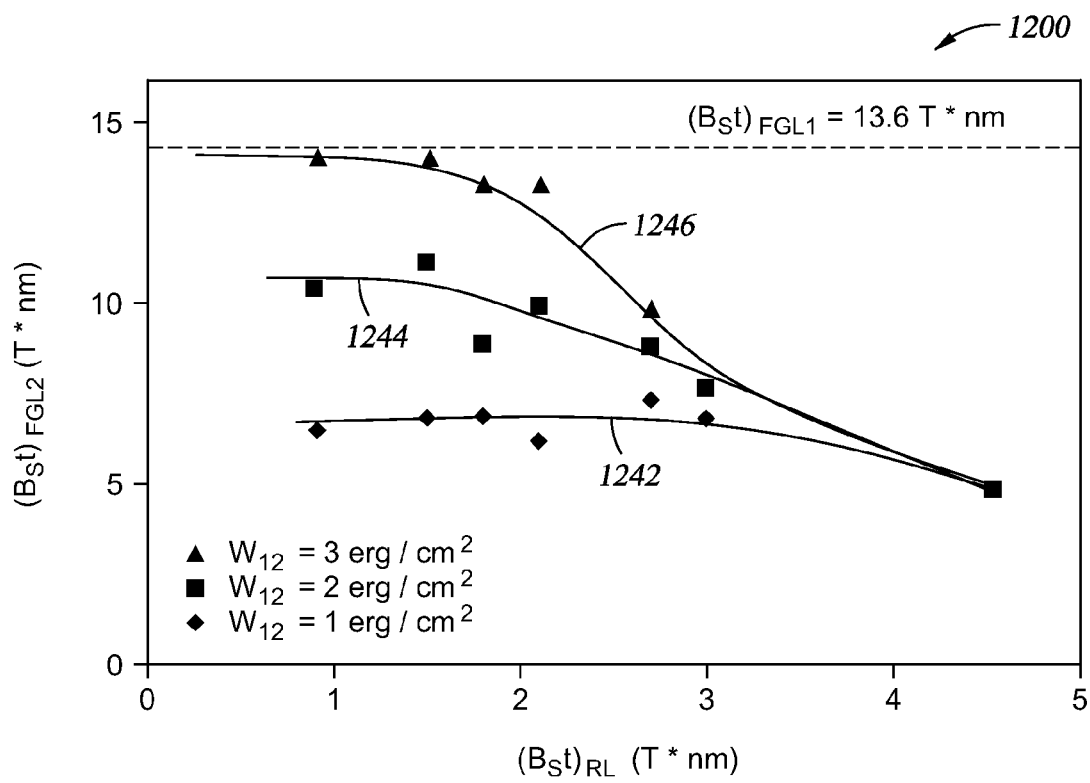
FIG. 12 illustrates a graph showing the product of the maximum magnetization and film thickness that can be stacked as the second FGL.

FIG. 12 is a graph 1200 showing the maximum values of $(B_s t)_{FGL2}$ of FGL 418 for the product $(B_s t)_{RL}$ of the saturated magnetization (0.57, 1.1, 1.7 T) and the film thickness (1.5, 2.5, 3.5 nm) of the reference layer 412 for the exchange interaction $w_{12}$ (=1, 2, 3 erg/cm$^2$) between three types of FGLs. The maximum value of $(B_s t)_{FGL2}$ for FGL 418 increases as $(B_s t)_{RL}$ of RL 412 decreases and reaches the saturation value when smaller than 2.0 T·nm. When $(B_s t)_{RL}$ of RL 412 is less than 1.0 T·nm, the oscillations easily become unstable. As the exchange interaction, $w_{12}$, between the FGLs increases, the maximum value of $(B_s t)_{FGL2}$ of FGL 418 can increase. However, it is believed that when $w_{12}$ becomes approximately equal to the exchange interaction in the FGL 418 material, a domain having magnetization components perpendicular to the stacked layer surface can easily form, and the high-frequency magnetic field does not increase. In addition, the maximum value of $(B_s t)_{FGL2}$ of FGL 418 cannot exceed the product $(B_s t)_{FGL1}$ of the saturated magnetization and the film thickness of FGL 410, which in one example is when $(B_s t)_{FGF1}$=13.6 T·nm. Line 1242 represents when $w_{12}$ is 1 erg/cm$^2$, line 1244 represents when $w_{12}$ is 2 erg/cm$^2$, and line 1246 represents when $w_{12}$ is 3 erg/cm$^2$.

Figure 13:
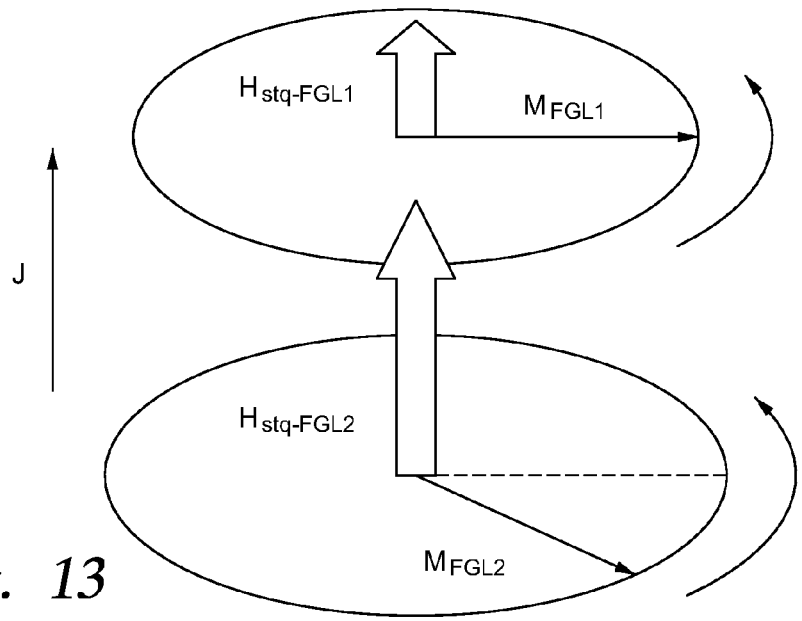
FIG. 13 shows the spin torque magnetic field and magnetization vectors of the first FGL and the second FGL.

FIG. 13 shows the spin torque magnetic field and magnetization vectors of FGL 410 and FGL 418 of the STO 400 of FIG. 4. It uses the fact that the spin torque magnetic field $H_{stq\text{-}FGL2}$ applied to the magnetization $m_{FGL2}$ of FGL 418 and the spin torque magnetic field $H_{stq\text{-}FGL1}$ applied to the magnetization $m_{FGL1}$ of FGL 410 are in the same direction, but the magnitudes generally differ. $m_{FGL2}$ and $m_{FGL1}$ are the unit magnetization vectors of FGL 418 and FGL 410, respectively. $(B_s t)_{FGL2}$ and $(B_s t)_{FGL1}$ are the products of the saturated magnetization and the film thickness of FGL 418 and FGL 410, respectively. J is the current density in the direction perpendicular to the stacked layer surface of the STO 400. The g-factor is a variable that depends on the polarizability P and the angle of magnetization and is denoted by $g_F$ because FGL 418 and FGL 410 are nearly parallel. If $(B_s t)_{FGL1}$>$(B_s t)_{FGL2}$ is designed, then $H_{stq\text{-}FGL1}$<$H_{stq\text{-}FGL2}$. The movement of the magnetization of the escaping FGL 410 is delayed and is tracked by the magnetization of the tracking FGL 418. Because the spin torque magnetic field depends on the outer product of $m_{FGL2}$ and $m_{FGL1}$, the direction of the spin torque magnetic field is reversed when the magnetization of FGL 418 passes the magnetization of FGL 410. Therefore, the magnetization of FGL 418 again tracks the magnetization of FGL 410, and the magnetization of FGL 410 cannot escape the magnetization of FGL 418. Consequently, the magnetization of FGL 418 and the magnetization of FGL 410 are maintained in nearly the parallel state, and the periphery of the applied magnetic field rotates continuously. Regarding FIG. 13, the relationship of $H_{stq\text{-}FGL1}$ and $H_{stq\text{-}FGL2}$ is:

$$H_{stq\text{-}FGL1} = (m_{FGL2} \times m_{FGL1}) \frac{CJ}{(B_s t)_{FGL1}} g_F \qquad \text{Equation 4}$$

$$H_{stq\text{-}FGL2} = (m_{FGL2} \times m_{FGL1}) \frac{CJ}{(B_s t)_{FGL2}} g_F \qquad \text{Equation 5}$$

$$C = \frac{2\mu_B}{\gamma e} \qquad \text{Equation 6}$$

Figure 14A:
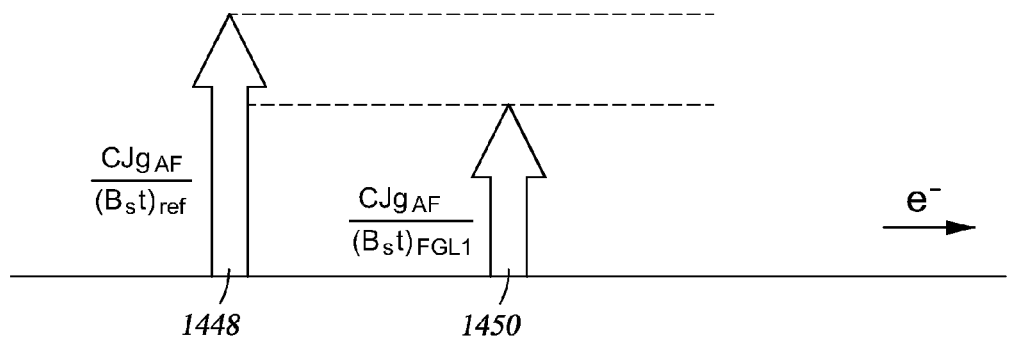
FIGS. 14A-14B show the state of the effective spin torque magnetic field of an extended STO structure and a conventional STO structure.

The principle of the conventional STO 500 of FIG. 5 and the principle of the extended STO 400 of FIG. 4 are explained in detail with reference to FIGS. 14A-14B. The drawings show the relative magnitude small tip angle (Sta) of the terms excluding the outer product term with the adjacent magnetization of the effective spin torque magnetic field. In the conventional STO 500 represented in FIG. 14A, arrow 1448 represents RL 412 and arrow 1450 represents FLG 410, where $$(B_s t)_{RL} < (B_s t)_{FGL1} \qquad \text{Equation 7:}$$

The Sta of RL 412 and FGL 410 becomes:

$$\frac{CJg_{AF}}{(B_s t)_{RL}} > \frac{CJg_{AF}}{(B_s t)_{FGL1}} \qquad \text{Equation 8}$$

The Sta of the magnetization of the escaping RL 412 is larger than the Sta of the magnetization of the tracking magnetic field generating layer FGL 410. The FGL 410 does not track the RL 412. Here, the escaping or tracking of the magnetization is determined by the direction of the electron spin (reverse of the current direction). Because the electron spin transmits the information of the released magnetization to the receiving magnetization, the magnetization receiving the electron spin is oriented in the direction of released magnetization (tracking). On the other hand, the magnetization for releasing the electron spin escapes from the receiving magnetization by the law of conservation of angular momentum.

Figure 14B:
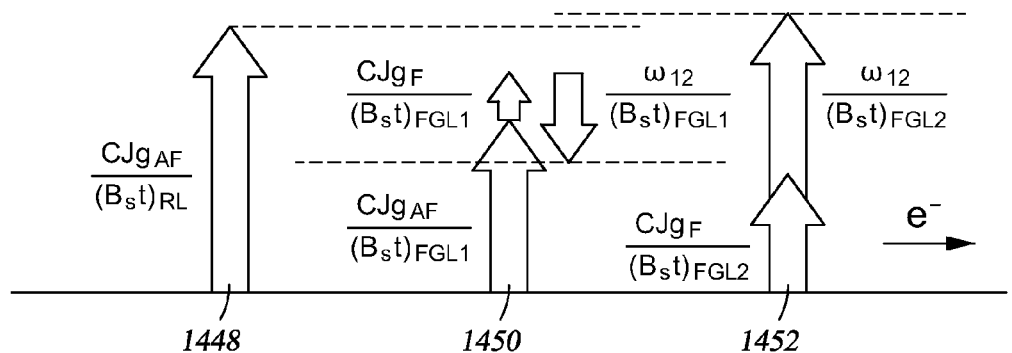

FIG. 14B shows the state of the effective spin torque magnetic field of the extended STO 400 of FIG. 4. Arrow 1448 represents RL 412, arrow 1450 represents FGL 410, and arrow 1452 represents FGL 418. In this case, even if the relationship between FGL 410 and FGL 418 is:

$$(B_s t)_{FGL1} > (B_s t)_{FGL2} \qquad \text{Equation 9:}$$

The Sta of FGL 410 does not simply become smaller than the Sta of FGL 418. The spin torque magnetic field applied to FGL 418 is exceeded because the spin torque magnetic fields from the RL 412 and from the FGL 418 are applied to the FGL 410. In this state, FGL 418 does not track FGL 410, and a parallel arrangement of FGL 410 and FGL 418 does not occur. In the realization of a parallel arrangement, the exchange interaction $w_{12}$ between FGL 410 and FGL 418 becomes important. The magnitude of the exchange interaction is inversely proportional to $(B_s t)$ similar to the spin torque magnetic field, but the exchange interaction can have the following relationship because the direction of action is reversed:

$$\frac{CJg_{AF}}{(B_s t)_{RL}} > \frac{CJg_{AF} + CJg_F - w_{12}}{(B_s t)_{FGL1}} < \frac{CJg_{AF} + w_{12}}{(B_s t)_{FGL1}} \quad \text{Equation 10}$$

In the parallel arrangement of FGL 410 and FGL 418, RL 412 can be anti-parallel to FGL 410 and FGL 418. Thus, the increase in the high-frequency magnetic field is expressed by:

$$\frac{(B_s t)_{FGL2}}{(B_s t)_{FGL1}} < \frac{g_F + w_{12}/CJ}{g_{AF} + g_F - w_{12}/CJ} \quad \text{Equation 11}$$

To increase the terms on the right side as much as possible, the exchange interaction $w_{12}$ between FGL 410 and FGL 418 must be increased. If the terms are too big, the magnetic domain in the direction perpendicular to the stacked layer surface is easily formed, and the effects of the current embodiment may be suppressed. When adjusting the magnitude of the exchange interaction, the thickness of the nonmagnetic spin transfer layers 414 and 420, such as Cu or NiAl, must be controlled to be approximately from 0.2 nm to 0.7 nm.

As described above, the oscillation characteristics of the extended STO 400 of the embodiment of FIG. 4 can be generally explained based on the value of $(B_s t)$. The magnetostatic interaction between FGL 410 and FGL 418, and FGL 410 and FGL 418 and the RL 412 omitted in the previous explanation of the principle must be considered.

FIGS. 15A to 15D show the results a study of the oscillation state of the STO 400 of FIG. 4 having a cross-sectional shape of 40 nm×40 nm at $(B_s t)_{FGL2}$ of 7.2 T·nm while the saturated magnetization $B_{s\text{-}FGL2}$ of FGL 418 was changed (A: 2.4 T, B: 2.0 T, C: 1.6 T, D: 1.2 T) and the thickness, $t_{FGL2}$, of FGL 418 was changed (A: 3.0 nm, B: 3.6 nm, C: 4.5 nm, D: 6.0 nm). The soft magnetic body had a film thickness $t_{RL}$ of 2.5 nm and a saturated magnetization $B_{s\text{-}RL}$ of 0.6 T in the reference layer 412, an $H_{k\text{-}ref}$ value of 12 kOe, and the soft magnetic body had a film thickness $t_{FGL1}$ of 6 nm and a saturated magnetization $B_{s\text{-}FGL1}$ of 2.4 T in FGL 410. The space between FGL 410 and FGL 418, $t_{12}$, and the space between FGL 410 and RL 412, $t_{1R}$, were 1.0 nm and 3.0 nm, respectively. The exchange interaction between FGL 410 and FGL 418, $w_{12}$, and the exchange interaction between FGL 410 and RL 412, $w_{1R}$, were 1.0 erg/cm$^2$ and 0 erg/cm$^2$, respectively. The damping constants of FGL 418, FGL 410, and RL 412 were 0.01, 0.05, and 0.05, respectively. Similar to FIGS. 9A-9D, graphs 1526, 1530, 1534, and 1538 show the oscillation frequency in GHz of each layer with respect to an external magnetic field. Graphs 1528, 1532, 1536, and 1540 show the normalized in-plane magnetization of each layer. In addition, as in FIGS. 9A-9D the circles O indicate structures having good oscillation characteristics as the STO for microwave-assisted recording. The triangle A indicates a structure that can be used, but with caution. The cross X indicates a structure for which the extended STO structure is ineffective.

Figure 15A:
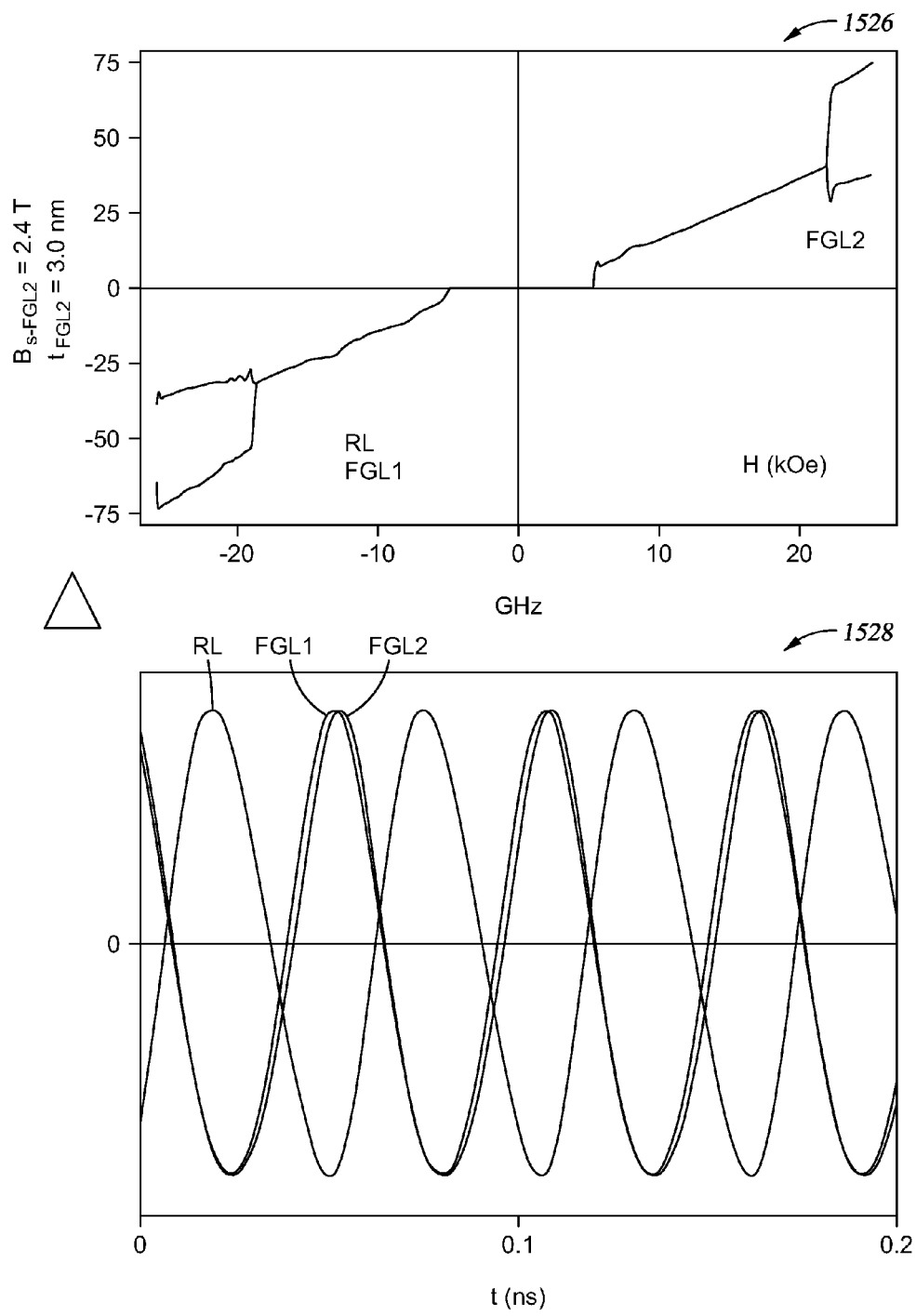
FIGS. 15A-15D show the oscillation characteristics of an extended STO structure according to one embodiment.

In FIG. 15A ($B_{s\text{-}FGL2}$=2.4 T, $t_{FGL2}$=3.0 nm), the oscillation frequencies of FGL 418, FGL 410, and RL 412 stop oscillating when the external magnetic field is small (−4 kOe to 7 kOe), as shown by graphs 1526 and 1528. The oscillation frequencies align in an oscillating external magnetic field in the range from −18 kOe to 18 kOe. For an external (gap) magnetic field of 10 kOe assumed for use as MAMR, the normalized in-plane magnetizations oscillate nearly aligned for FGL 418 and FGL 410, and both maintain the parallel state and rotate. Then, the normalized in-plane magnetization of RL 412 oscillates at a phase offset by approximately 180° from FGL 418 and FGL 410, maintains the anti-parallel states of the FGL magnetizations, and rotates. Consequently, use as the STO for MAMR is not a problem.

Figure 15B:
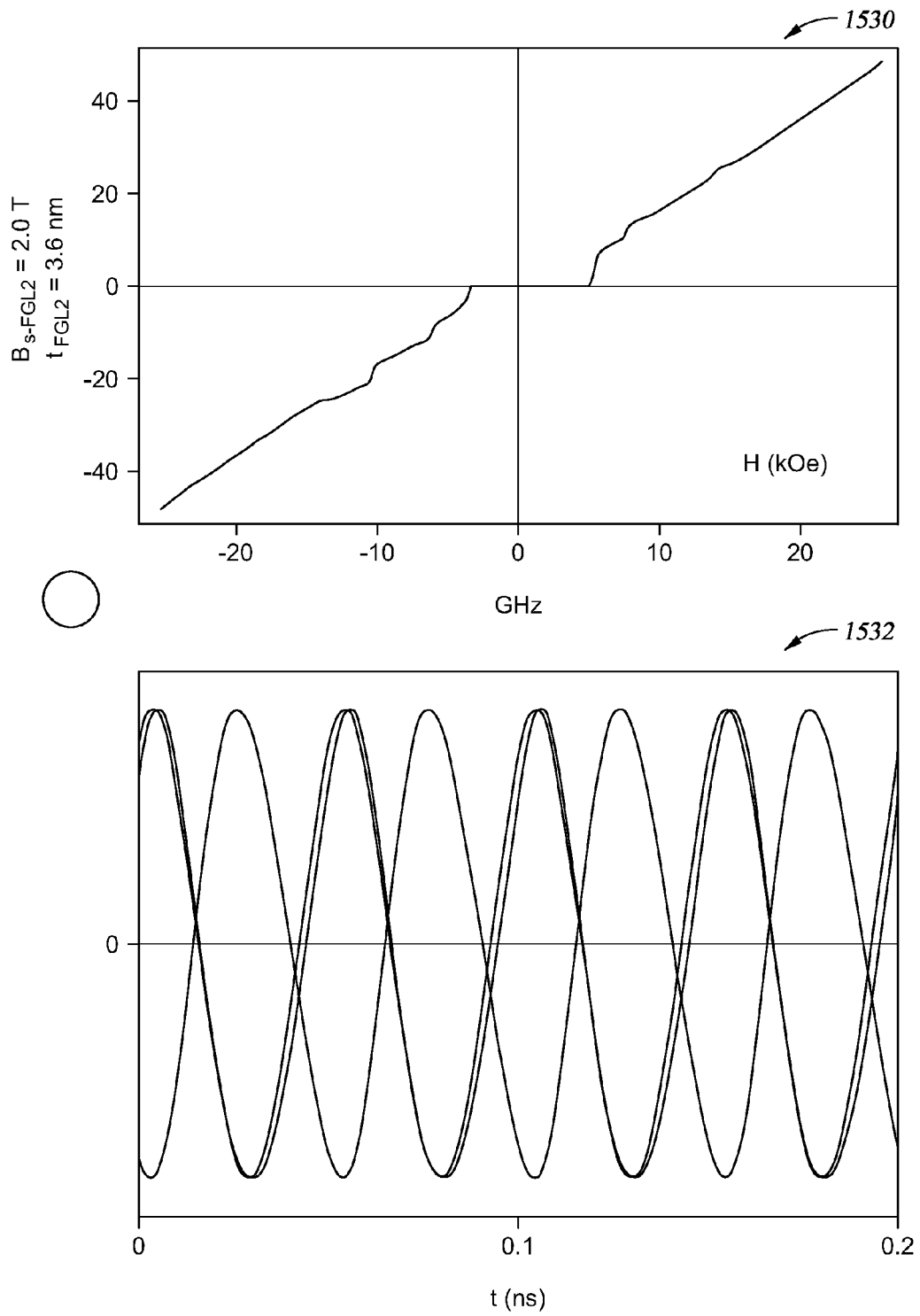
Figure 15C:
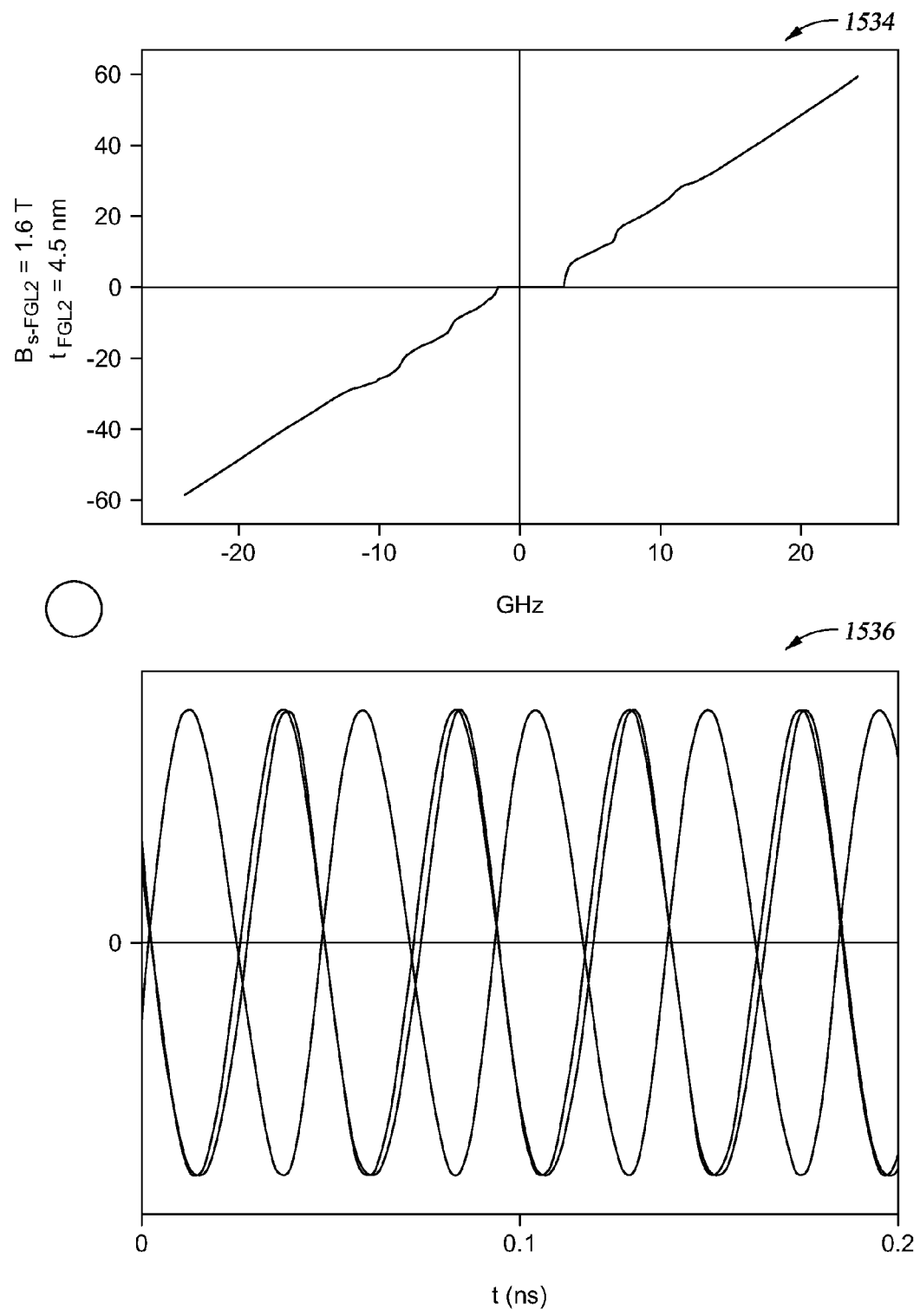

In FIG. 15B ($B_{s\text{-}FGL2}$=2.0 T, $t_{FGL2}$=3.6 nm) and in FIG. 15C ($B_{s\text{-}FGL2}$=1.6 T, $t_{FGL2}$=4.5 nm), the oscillation frequencies of FGL 418, FGL 410, and RL 412 stop oscillating when the external magnetic field is small (−3 kOe to 5 kOe), but the oscillation frequencies align in the oscillation range, as shown by graphs 1530 and 1532, and graphs 1534 and 1536. For an external (gap) magnetic field of 10 kOe assumed for use as MAMR, the normalized in-plane magnetization has nearly aligned oscillations of FGL 418 and FGL 410. Both maintain the parallel state and rotate. Then, the normalized in-plane magnetization of RL 412 oscillates at a phase offset by approximately 180° from FGL 418 and FGL 410, maintains the anti-parallel states of the FGL magnetizations, and rotates. Consequently, there is no problem in use as the STO for MAMR.

Figure 15D:
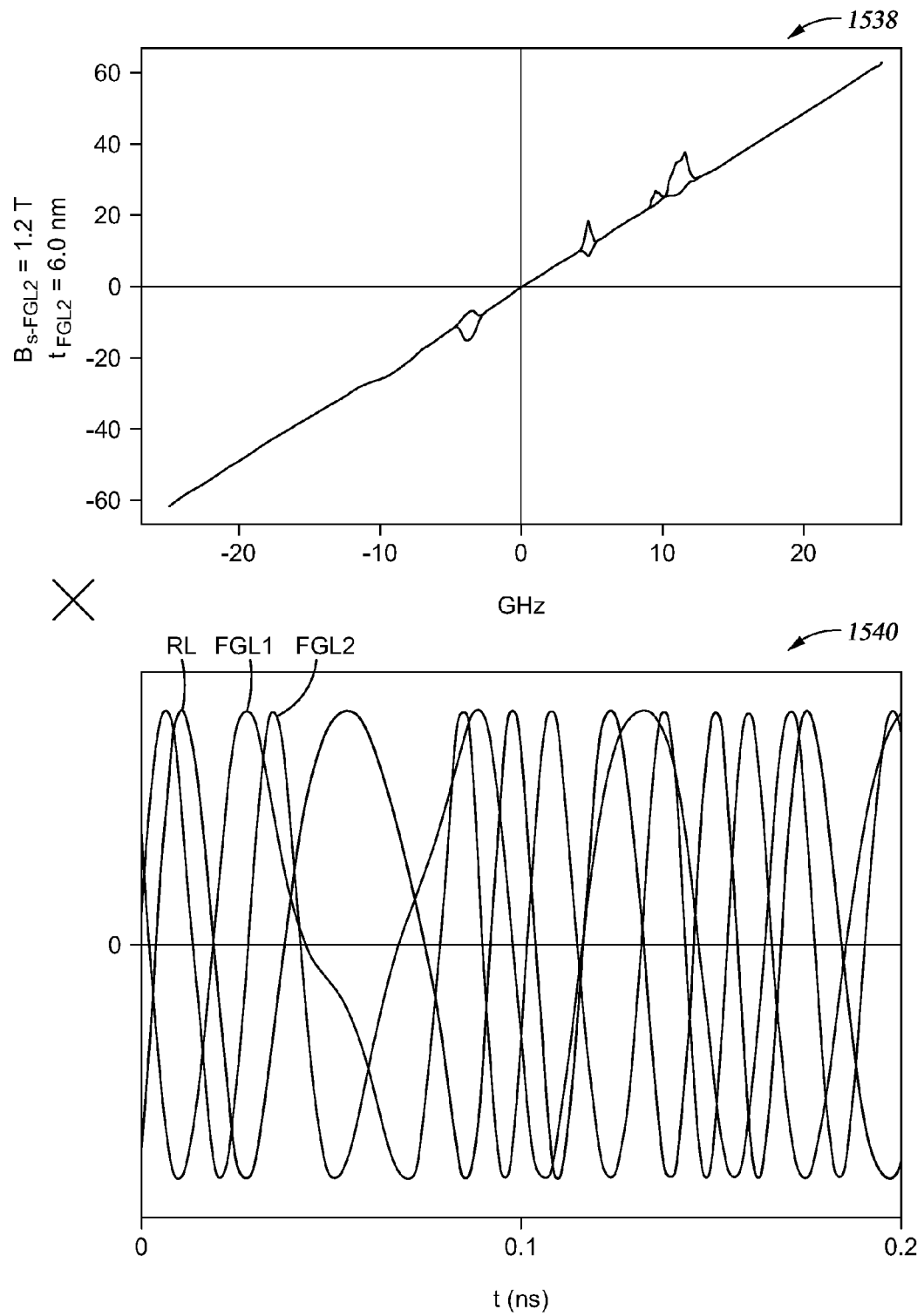

In FIG. 15D ($B_{s\text{-}FGL2}$=1.2 T, $t_{FGL2}$=6.0 nm), the oscillation frequencies of FGL 418, FGL 410, and RL 412 almost align, and do not stop oscillating when the external magnetic field is small, as shown by graphs 1538 and 1540. This is considered to be the ideal generation state. The behavior of the normalized in-plane magnetization in a 10 kOe external magnetic field is not ideal. RL 412 and FGL 410 oscillate at a phase offset by approximately 180°, but the frequencies are not constant, and the RL 412 magnetization is not synchronized. In this structure, the desired effects of are not obtained.

Figure 16:
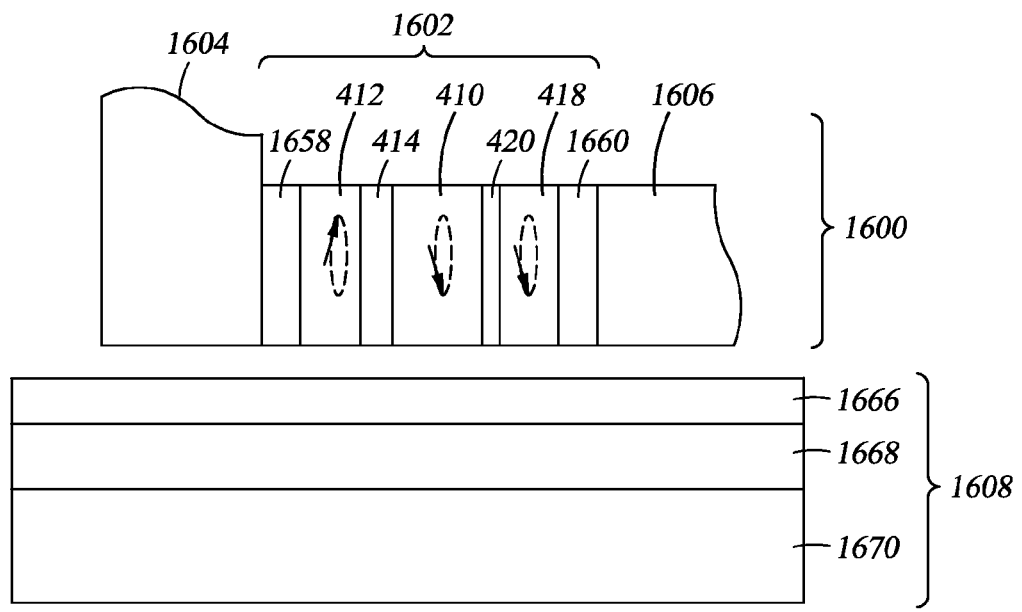
FIG. 16 illustrates a cross sectional of a magnetic head and a recording medium.

FIG. 16 is a schematic cross-sectional view of the magnetic recording head 1600 of one embodiment cut by a plane perpendicular (vertical direction in the drawing) to the recording medium surface and parallel to the head advancing direction (track direction which is the horizontal direction in the drawing). The drawing shows a cross section of the medium. The recording head 1600 comprises a magnetic circuit in the top part of the drawing between a main magnetic pole 1604 and an opposite magnetic pole 1606. The top part in the drawing is electrically insulated for the most part. The magnetic circuit forms a closed path of the magnetic force lines. It does not have to be formed in only the magnetic body. In addition, the magnetic circuit may be formed with the auxiliary magnetic pole placed on the side opposite the opposite magnetic pole 1606 of the main magnetic pole 1604. In this case, electrical insulation is not necessary between the main magnetic pole 1604 and the auxiliary magnetic pole. Furthermore, coils for exciting these magnetic circuits, copper wire, etc. are provided in the magnetic recording head 1600. An STO 1602 is formed between the main magnetic pole 1604 and the opposite magnetic pole 1606. An electrode or means for electrical contact with the electrode is provided in the main magnetic pole 1604 and the opposite magnetic pole 1606, and is constructed to make the STO 1602 drive current flow from the main magnetic pole 1604 side to the opposite magnetic pole 1606 side or in the reverse direction. The materials of the main magnetic pole 1604 and the opposite magnetic pole 1606 are a CoFe alloy that has a larger saturated magnetization and almost no magnetocrystalline anisotropy. In a recording medium 1608, a stacked layer film forming 10 nm Ru layer on 30 nm CoFe as an underlayer 1668, and a CoCrPt-SiOx layer that has a total film thickness of 15 nm, a 15-kOe magnetic anisotropic magnetic field 4 nm from the surface, magnetic anisotropy that increases in steps in the depth direction, and an average magnetic anisotropic magnetic field of 2.4 MA/m (30 kOe) as a recording layer 1666 on the substrate 1670.

The STO 1602 composes of a non-magnetic spin scatterer 1658, a reference layer 412, a first non-magnetic spin transfer layer 414, a first magnetic field generating layer 410, a second non-magnetic spin transfer layer 420, a second magnetic field generating layer 418, and a second non-magnetic spin scatterer 1660, and is formed in layers adjacent to the main magnetic pole 1604 and extends to the opposite magnetic pole 1606. In a columnar structure extending in the horizontal direction in the drawing from the non-magnetic spin scatterer 1658 to the second non-magnetic spin scatterer 1660, the cross-sectional plane has a rectangular shape that is long along the media facing surface (MFS), such as an air-bearing surface (ABS). Because shape anisotropy is created in the track width direction by using the appropriate rectangular shape, the in-plane magnetization can rotate smoothly even when there is a leaking magnetic field component from main magnetic pole 1604 in the in-plane direction of the first magnetic field generating layer 410 and the second magnetic field generating layer 418. The main magnetic pole 1604 and the first magnetic field generating layer 410 can be closer. The length along an edge of the MFS of the rectangle is an important factor for determining the recording track width, and was set to 40 nm in one embodiment. In microwave-assisted recording, a recording medium 1608 having large magnetic anisotropy that cannot record satisfactory is used when the recording magnetic field from the main magnetic pole 1604 and the high-frequency magnetic fields from the first magnetic field generating layer 410 and the second magnetic field generating layer 418 are not aligned. Therefore, the width and thickness (length in the head advancing direction) of the main magnetic pole 1604 can be set to large values so that a large recording density magnetic field is taken. In one embodiment, an approximately 0.9 MA/m recording magnetic field is obtained by setting a 60 m width and a 100 nm thickness.

Figure 17A:
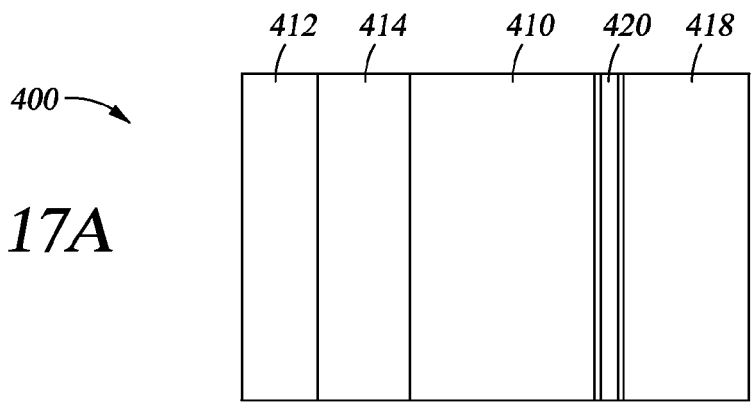
FIGS. 17A-17B illustrate a structure of an extended STO structure according to one embodiment and a conventional STO structure.
Figure 17B:
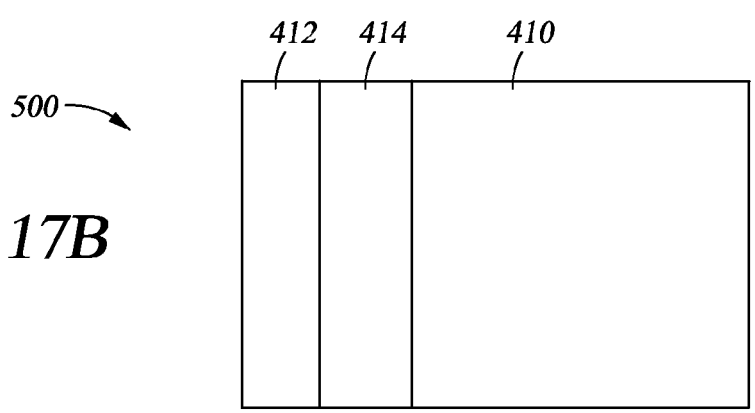

A 1.5 nm (Ni/Co)n multilayered film with a saturated magnetization of 1.3 T was used in reference layer 412. The magnetic field applied to the STO 1602 of this embodiment was approximately 0.8 MA/m (10 kOe) when analyzed by using 3D magnetic field analysis software because the length from the end surface of the main magnetic pole 1604 to the end surface of the opposite magnetic pole 1606 was 40 nm, and the height of the first magnetic field generating layer 410 was 38 nm. The first magnetic field generating layer 410 was a 6 nm thick CoFe alloy with a saturated magnetization of 2.35 T that increased the saturated magnetization and had almost no magnetocrystalline anisotropy. The second magnetic field generating layer 418 was a 3-nm thick CoFe alloy with a saturated magnetization of 2.35 T with increased saturated magnetization and almost no magnetocrystalline anisotropy, as shown by the STO 400 in FIG. 17A. The RL 412 was 1.5 nm with a saturated magnetization of 1.3 T, the first non-magnetic spin transfer layer 414 was 3 nm of Cu and the second non-magnetic spin transfer layer 420 was 0.5 nm of Cu. For comparison, a conventional STO 500, formed without a second non-magnetic spin transfer layer 420 and a second magnetic field generating layer 418, varied the thickness of the first magnetic field generating layer 410 from 1 nm to 11 nm was also fabricated, as shown in FIG. 17B. The RL 412 was 1.5 nm with a saturated magnetization of 1.3 T and the first non-magnetic spin transfer layer 414 was 3 nm of Cu. In the magnetic field generating layer 410, magnetization in the plane along the layer rotates a high speed, and the leaking magnetic field from the magnetic pole emerging at the MFS plane and the side surface acts as a high-frequency magnetic field. When materials with a large saturated magnetization having negative perpendicular magnetic anisotropy are used in the magnetic field generating layer 410, such as (Co/Fe)n multilayered film, high-frequency magnetic fields with more stable in-plane magnetization rotation are obtained.

The STO 1602 of one embodiment must have an STO drive current flowing from the opposite magnetic pole 1606 side to the main magnetic pole 1604 side in order to obtain spin torque oscillations in the AF mode because the reference layer 412 is between the main magnetic pole 1604 and the first magnetic field generating layer 410. In an STO having a magnetic layer structure composed of three layers having a non-magnetic spin transfer layer between the layers, such as STO 1602, the current must flow from the side having a thick layer for the exterior magnetic layer to the thin layer side, from the side having a large saturated magnetization in the exterior magnetic layer to the small side, or from the thin side of the non-magnetic spin transfer layer to the thick side.

The direction of magnetization rotation of the magnetic field generating layer 410 becomes clockwise when viewed from the main magnetic pole 1604 side when the magnetic flux is injected from the main magnetic pole 1604. The high-frequency magnetic field in the same direction of rotation as the direction of precession motion of the recording medium magnetization that should undergo reverse magnetization can be applied at a position between the main magnetic pole 1604 and the magnetic field generating layer 410. When the magnetic flux is injected in the main magnetic pole 1604, the flux is counterclockwise when viewed from the main magnetic pole 1604 side. Similarly, a high-frequency magnetic field in the same direction of rotation as the direction of the precession motion of the recording medium magnetization that should undergo reverse magnetization can be applied. Consequently, the rotating high-frequency magnetic fields generated by the first magnetic FGL 410 and the second magnetic FGL 418 do not depend on the polarity of the main magnetic pole 1604, and have the effect of assisting magnetization reversal caused by the main magnetic pole 1604. The effects are not obtained by a high-frequency magnetic field generator that does not change the orientation of the spin torque by using the polarity of the main magnetic pole 1604.

The spin torque action increases as the STO drive current, or electron current, increases and becomes larger when about 1 nm of Co having a large polarizability is inserted between the non-magnetic spin transfer layer and the adjacent ferromagnetic layer. In one embodiment, the first non-magnetic spin transfer layer 414 was 3 nm Cu, and the second non-magnetic spin transfer layer 420 was 0.7 nm Cu. The non-magnetic spin scatterers 1658 and 1660 were 3 nm Ru.

Figure 18:
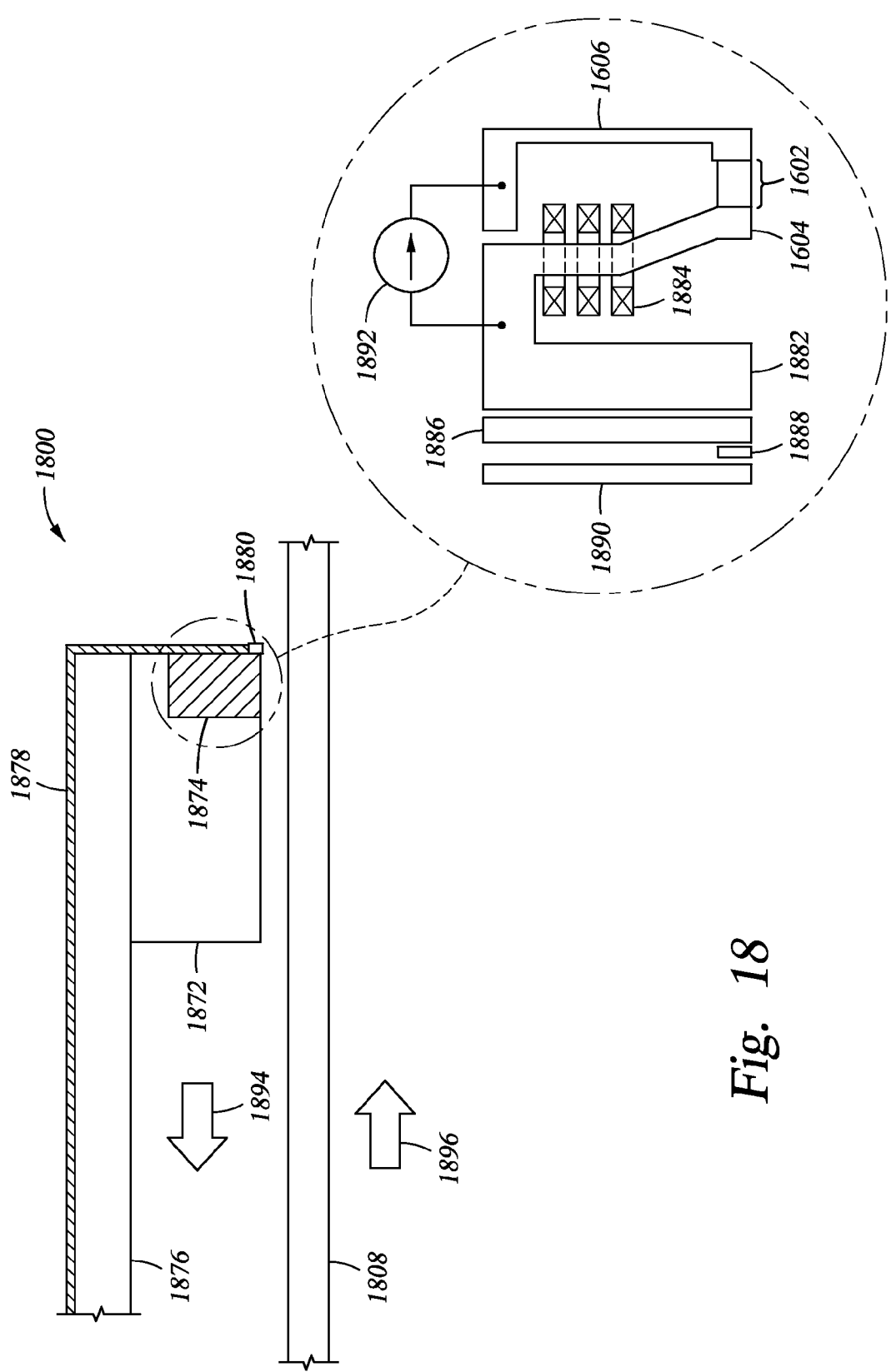
FIG. 18 illustrates an enlarged cross-sectional view of a slider and a recording playback unit mounted on the slider.

As shown in FIG. 18, a magnetic head 1800 comprises a magnetic head slider 1872 mounted on a recording and playback unit 1874, the recording and playback unit 1874 including the STO 1602. The recording medium 1808 was attached to a suspension 1876. A spin stand was used to examine the recording and playback characteristics. The recording and playback unit 1874 is comprised of a recording head and a playback head. As shown in the enlargement in the drawing, the recording head is comprised of an auxiliary magnetic pole 1882, the STO 1602 provided between the main magnetic pole 1604 and the opposite magnetic pole 1606, and a coil 1884 for exciting the main magnetic pole 1604. The playback head is comprised of a playback sensor 1888 arranged between a lower shield 1890 and an upper shield 1886. The auxiliary magnetic pole 1882 and the upper shield 1886 may also be used together. The drive current of each structural element of the recording and playback unit 1874 is supplied by wires 1878 to each structural element through a terminal 1880. In the enlarged drawing, a power supply 1892 for current flow into the STO 1602 is shown schematically. In practice, the power supply 1892 is provided outside of the slider 1872, and the STO drive current is supplied by the power supply 1892 through wires 1878 to the STO 1602. Arrow 1894 represents the travel direction of the magnetic head 1800, and arrow 1896 represents the direction of rotation of the recording medium.

Magnetic recording is conducted at a relative speed between the head 1800 and the medium 1808 of 20 m/s, a magnetic spacing of 7 nm, and a track pitch of 50 nm, and playback is conducted by a GMR head with a shield gap of 15 nm. Initially, the signal-to-noise ratio was 9.0 dB when the STO drive current did not flow, the 1300 kFCI signal was recorded at 512 MHz. Next, the current flows to the STO 1602 and the microwave assist effect is measured. The increase in the signal-to-noise ratio with respect to the signal-to-noise ratio when STO drive current was not flowing is defined as ΔSNR in decibels.

Figure 19:
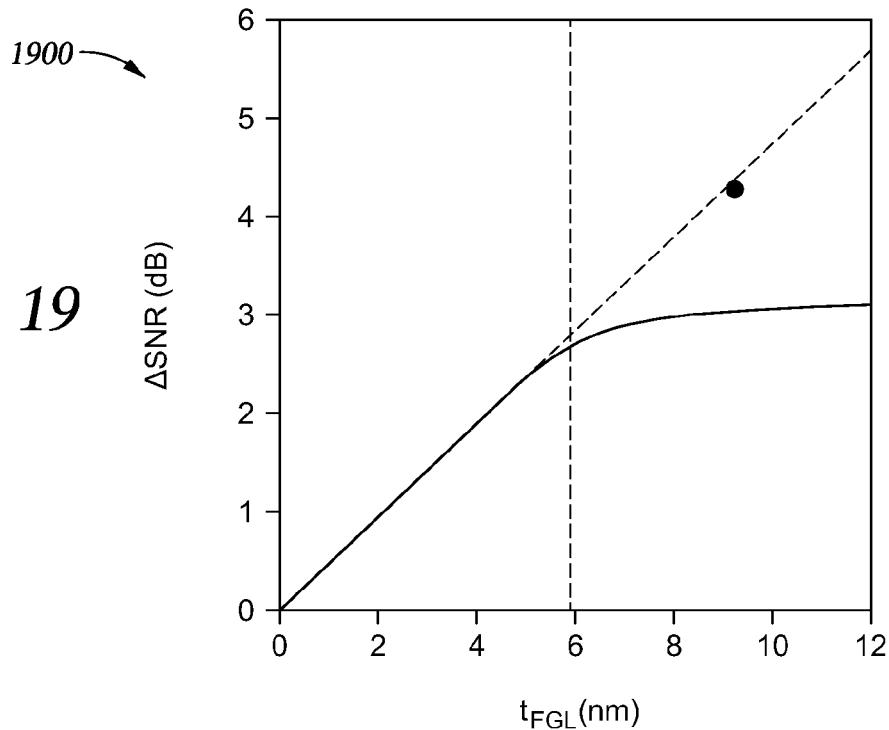
FIG. 19 shows the effects of an extended STO structure according to one embodiment.

FIG. 19 is a graph 1900 showing the STO 1602 effect of FIG. 18, according to one embodiment, and shows the ΔSNR with respect to the total FGL 410 and FGL 418 film thickness. In a conventional STO structure 500, such as the one in FIG. 17B, fabricated for comparison, ΔSNR increased in proportion to the FGL 410 film thickness and no longer increased when some film thickness was reached, which in one example is 6 nm. When 6 nm is exceeded, it is believed that a magnetic domain structure develops in the direction of the film thickness, the magnetic charge generated on the FGL 410 side surface does not increase, and the high-frequency magnetic field no longer increases. In contrast, the ΔSNR with respect to the total thickness ($t_{FGL1}+t_{FGL2}$) of FGL 410 and FGL 418 is indicated by the solid dot in FIG. 19 for the STO 400 of FIG. 17A. It is believed that a magnetic domain structure does not form in the film thickness direction. In contrast to the maximum of 11.7 dB obtained by the conventional STO structure 500, a signal-to-noise ratio of 13.1 dB was obtained by the extended STO 400. Therefore, it was seen that an information transfer speed exceeding 1 Gbit/s could be realized at recording densities exceeding 1 Tbit/in$^2$. The frequency of this high-frequency magnetic field was 20 GHz. When the STO drive current flowed from the main magnetic pole 1604 to the opposite magnetic pole 1606, a satisfactory SNR was not obtained.

Figure 20:
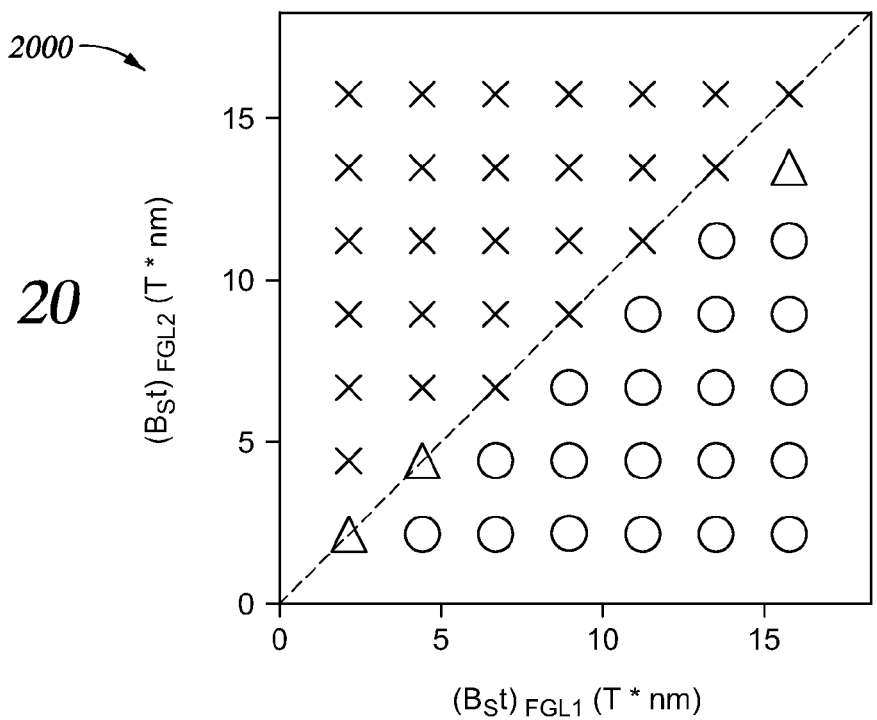
FIG. 20 illustrates a graph showing the oscillation characteristics of an extended STO structure according to one embodiment.

Another embodiment is described with reference to FIG. 20. For the embodiment shown in FIG. 16, FIG. 20 is a graph 2000 showing the results of measuring the oscillation states of the important parts of the STO 1602 without the main magnetic pole 1604; the non-magnetic spin scattering layers 1658 and 1660; and the opposite magnetic pole 1606. The reference layer 412 was 3.0 nm Ni film with a saturated magnetization of 0.49 T. The first non-magnetic spin transfer layer 414 was 3 nm NiAl, and the second non-magnetic spin transfer layer 412 was 0.3 nm Cu. STO 1602 was fabricated by varying FeCo having a saturated magnetization of 2.35 T from 1 nm to 7 nm in FGL 410 and FGL 418. In the measurements, a 15 kOe external magnetic field was applied perpendicular to the film surface. The circles O indicate structures that obtained good oscillations. The triangles Δ indicate structures that had unstable oscillations. The crosses X indicate structures that did not oscillate. It was clear that there was no oscillation when the product $(B_s t)_{FGL2}$ of the saturated magnetization and the film thickness of FGL 418 exceeded the $(B_s t)$ of FGL 410.

Figure 21A:
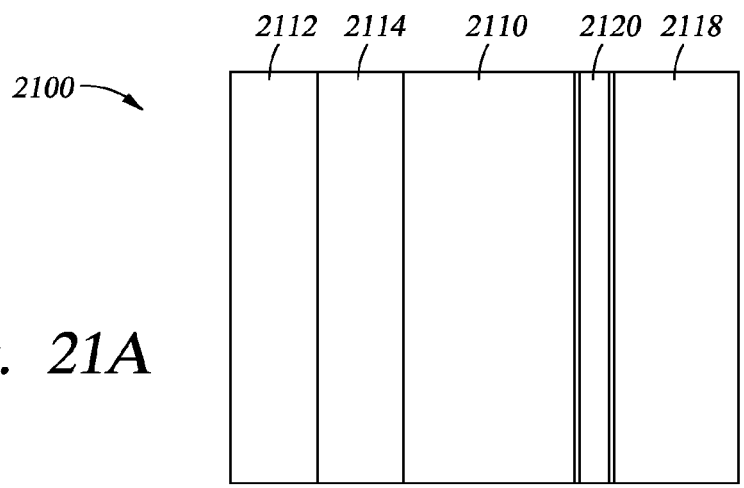
FIGS. 21A-21B illustrate a general view and the effects of an extended STO structure according to one embodiment.
Figure 21B:
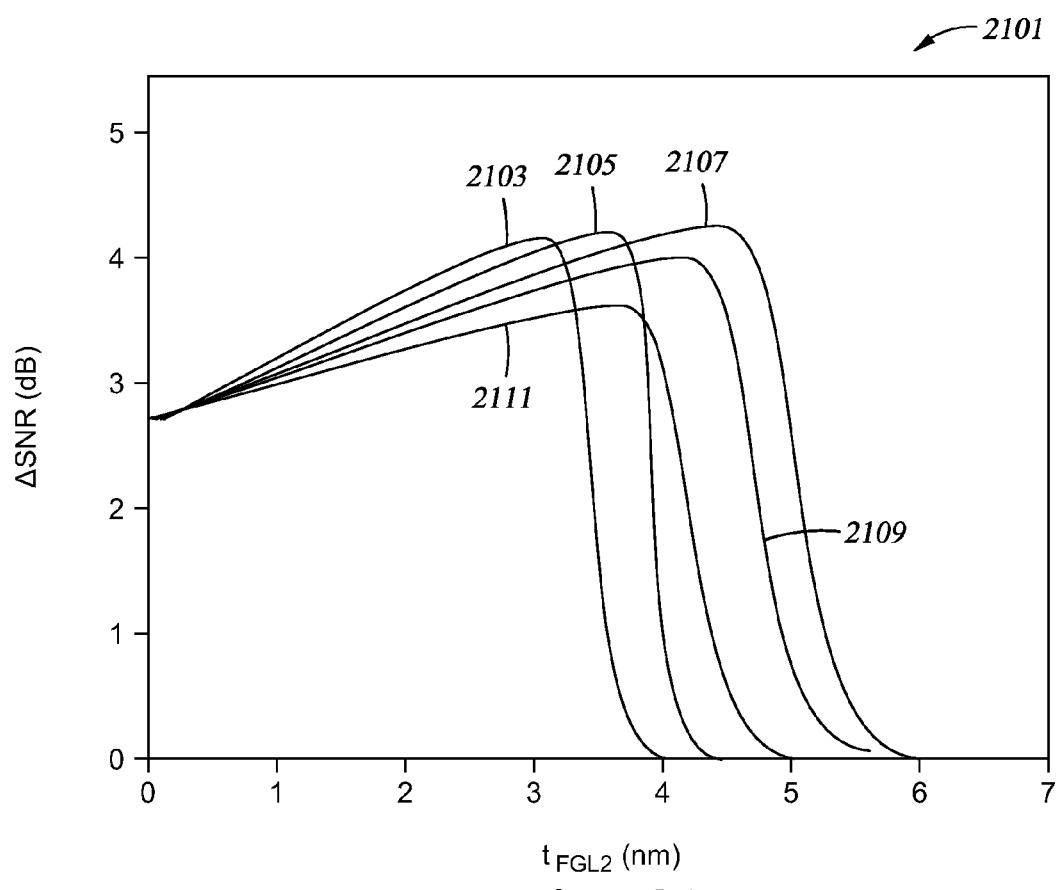

In a similar structure to that in FIG. 16, the magnetic materials used in STO 2100 (CoFe: 2.35 T, Fe: 2.2 T, Co: 1.8 T, (Co/Ni)n: 1.6 T, (Ni/Co)n) and their thicknesses (0 to 7 nm) were changed, as shown in FIG. 21A, and the ΔSNR was measured, as shown in graph 2101 of FIG. 21B. In FIG. 21A, the STO 2100 comprises an RL 2112, a first non-magnetic spin transfer layer 2114, an FGL 2110, a second non-magnetic spin transfer layer 2120, and an FGL 2118, similar to STO 400 of FIG. 4. In graph 2101 of FIG. 21B, line 2103 represents CoFe with a saturated magnetization of 2.35 T, line 2105 represents Fe with a saturated magnetization of 2.2 T, line 2107 represents Co with a saturated magnetization of 1.8 T, line 2109 represents (Co/Ni)n with a saturated magnetization of 1.6 T, and line 2111 represents (Ni/Co)n with a saturated magnetization of 1.3 T. The ΔSNR increases with the film thickness of FGL 2118, and rapidly decreases to zero when some film thickness is reached. This indicates that when the ΔSNR is zero, the STO 2100 no longer oscillates. The FGL 2118 material has a maximum ΔSNR that is at nearly the same level if the saturated magnetization exceeds 1.8 T.

Figure 22:
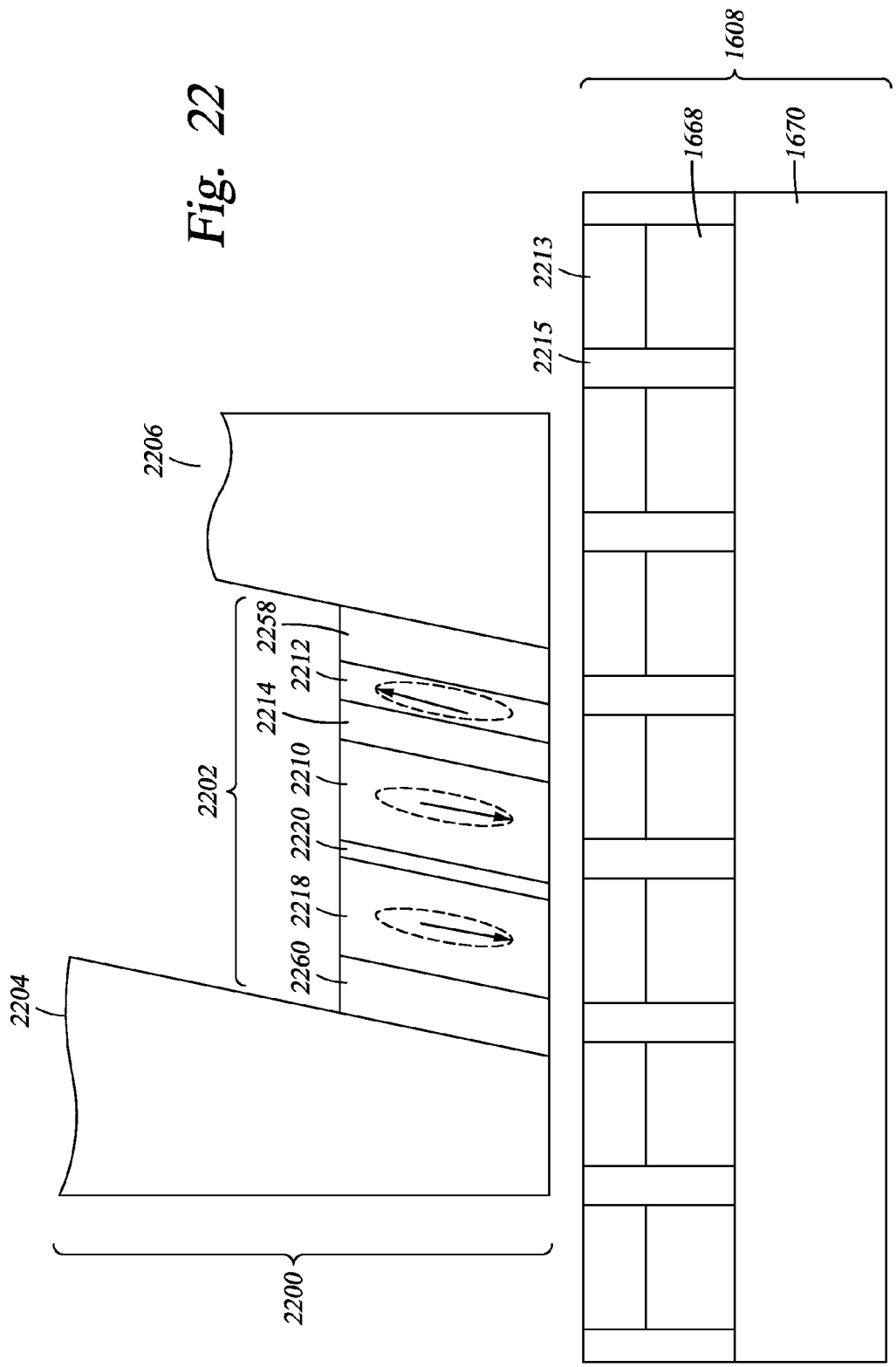
FIG. 22 shows a cross-sectional view of a magnetic recording head according to one embodiment.

Another embodiment is described with reference to FIG. 22. FIG. 22 is a cross-sectional schematic view of the magnetic recording head 2200 cut by plane perpendicular to the recording medium 1608 plane and parallel to the head advancing direction. FIG. 22 also shows the cross-section of the medium. A feature of this embodiment is that a main magnetic pole 2204 is tilted toward an opposite magnetic pole 2206 side with reference to the ABS plane. By tilting the main magnetic pole 2204, the recording magnetic field can strengthen, and the recording magnetic field gradient can become larger. In addition, the gap magnetic field of the opposite magnetic pole 2206 enters perpendicular to the stacked layer surface of a STO 2202, and a FGL 2210 can be closer to the main magnetic pole 2204. On the other hand, a problem was a decrease in the effective high-frequency magnetic generated by the FGL 2210. When the extended STO 2202 is used, a high-frequency magnetic field can be increased, and the compatibility with the tilted main magnetic pole 2204 is good, as shown in FIG. 22.

A recording head 2200 comprises a magnetic circuit in the top part of the drawing between the main magnetic pole 2204 and the opposite magnetic pole 2206. The top part in the drawing is electrically insulated for the most part. The magnetic circuit forms a closed path of the magnetic force lines. It does not have to be formed in only the magnetic body. In addition, the magnetic circuit may be formed with the auxiliary magnetic pole placed on the side opposite the opposite magnetic pole 2206 of the main magnetic pole 2204. In this case, the gap between the main magnetic pole 2204 and the auxiliary magnetic pole does not have to be electrically insulated. Furthermore, coils for exciting these magnetic circuits, copper wires, etc. are provided in the magnetic recording head 2200. The STO 2202 is formed between the main magnetic pole 2204 and the opposite magnetic pole 2206. Electrodes or means for electrical contact with the electrodes are provided in the main magnetic pole 2204 and the opposite magnetic pole 2206, and are constructed to make the STO drive current flow from the main magnetic pole 2204 side to the opposite magnetic pole 2206 side or the reverse. The material of the main magnetic pole 2204 and the opposite magnetic pole 2206 was CoFe alloy that has a large saturated magnetization and almost no magnetocrystalline anisotropy. The recording medium 1608 was a stacked layer film formed from a 10 nm Ru layer on 30-nm CoFe formed as an underlayer 1668, and a CoCrPt layer structure that has a total film thickness of 15 nm, a magnetic anisotropic magnetic field of 17 kOe that is 4 nm from the surface, magnetic anisotropy increasing gradually in the depth direction, and an average magnetic anisotropic magnetic field of 2.8 MA/m (30 kOe) as a recording layer 2213 formed on a substrate 1670, and etched to form a pattern (46 nm track pitch, 9 nm bit pitch) corresponding to 1.5 Tbits/in². SiOx was embedded in a bit gap 2215.

The STO 2202 composed of a second non-magnetic spin scatterer 2260, a FGL 2218, a second non-magnetic spin transfer layer 2220, a FGL 2210, a first non-magnetic spin transfer layer 2214, a reference layer 2212, and a non-magnetic spin scatterer 2258, and is formed in a layered form adjacent to the main magnetic pole 2204 and extends to the opposite magnetic pole 2206. In a columnar structure extending in the horizontal direction in the drawing from the non-magnetic spin scatterer 2258 to the second non-magnetic spin scatterer 2260, the cross-sectional plane has a rectangular shape that is long along the ABS. Because the stacked layers are inclined, it should be noted that FGL 2210 and FGL 2218 have shape magnetic anisotropy and are easily magnetized in the height direction. It is not preferred for the magnetization in this direction when not oscillating to become the cause of the degaussing of the magnetization of recorded medium. The STO 2202 in this embodiment must make the STO drive current flow from the main magnetic pole 2204 to the opposite magnetic pole 2206 to obtain spin torque oscillation in the AF mode because the reference layer 2212 is between the opposite magnetic pole 2206 and the first magnetic field generating layer 2210. In an STO having a magnetic layer structure composed of three layers with a non-magnetic spin transfer layer between the layers, like STO 2202, current must flow from the side having a thick layer for the exterior magnetic layer to the thin layer side, from the side having a large saturated magnetization in the exterior magnetic layer to the small side, or from the thin side of the non-magnetic spin transfer layer to the thick side.

FIG. 23 is a table 2300 showing the effects of the top 45 structural conditions of the STO 2202 included in the head 2200 of FIG. 22. The FGL 2210 was set to 6 nm FeCo with a saturated magnetization of 2.35 T. The reference layer 2212 was 1.5 nm, 2.5 nm, 3.0 nm of Ni (0.49 T); 1.5 nm, 2.5 nm of (Ni/Co)n multilayered film (1.3 T); and 1.5 nm, 2.5 nm of (Co/Ni)n multilayered film (1.6 T). The FGL 2218 was 1 nm to 7 nm of FeCo (2.35 T), Fe (2.2 T), Co (1.8 T); (Co/Ni)n multilayered film (1.6 T); and (Ni/Co)n multilayered film (1.3 T). The non-magnetic spin transfer layer 2220 between the FGL 2210 and the FGL 2218 was a combination of 0, 0.2 nm, 0.3 nm, 0.5 nm, 0.7 nm, and 1.0 nm of Cu or NiAl. The ΔSNR was measured for 1225 combinations of the heads of different embodiments. The conditions and ΔSNRs values of the top 45 ΔSNRs are listed.

Figure 24A:
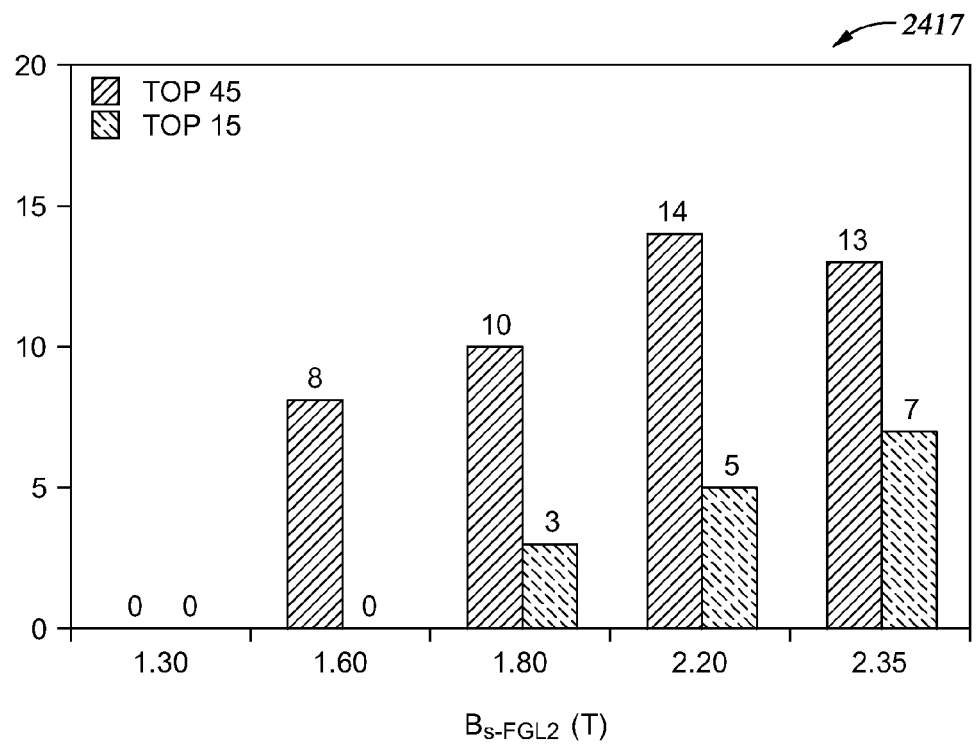
FIG. 24A shows a graph of a study of the optimal range of saturated magnetization of the second FGL, $B_{s\text{-}FGL2}$.
Figure 24B:
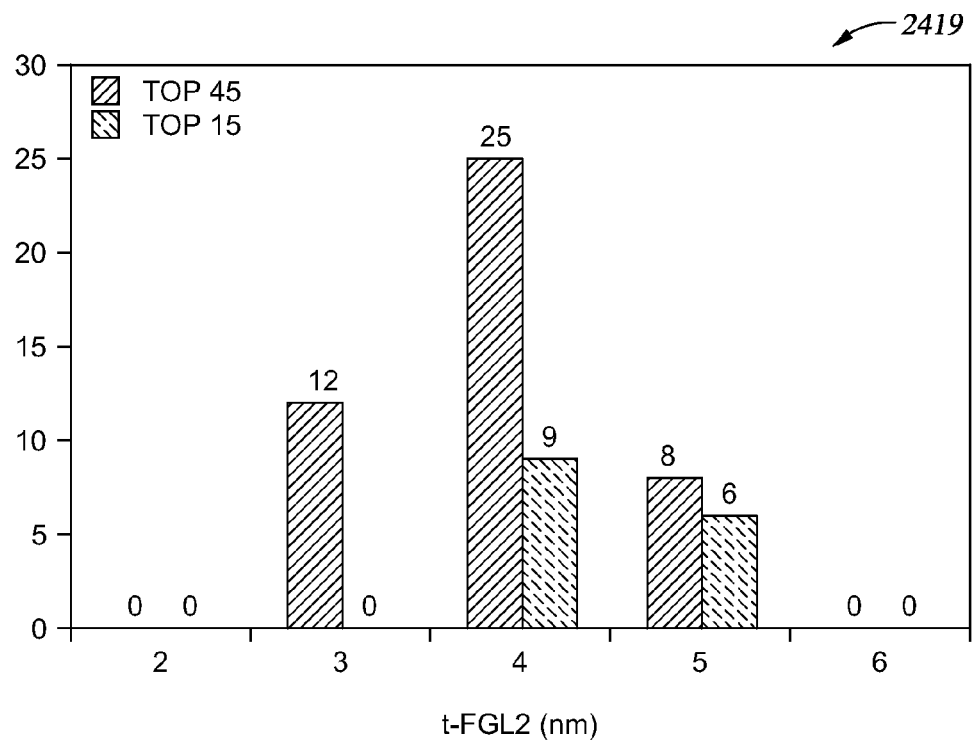
FIG. 24B shows a graph of a study of the optimal range of the thickness of the second FGL, $t_{FGL2}$.
Figure 24C:
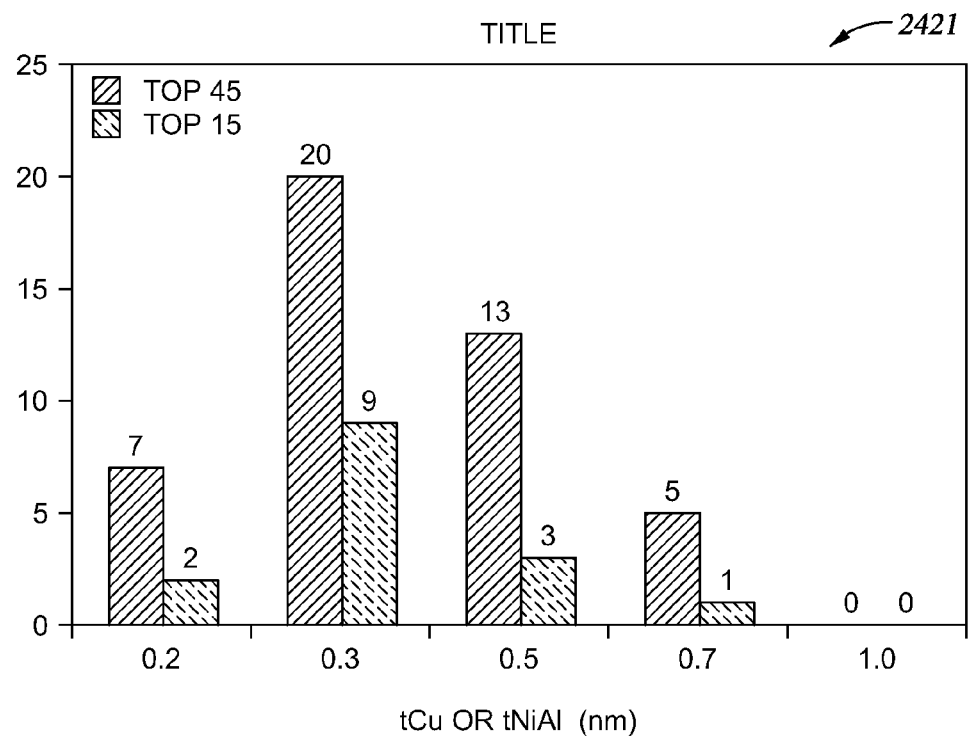
FIG. 24C shows a graph of a study of the optimal range of the thickness of the non-magnetic spin transfer layer between the two FGLs.
Figure 24D:
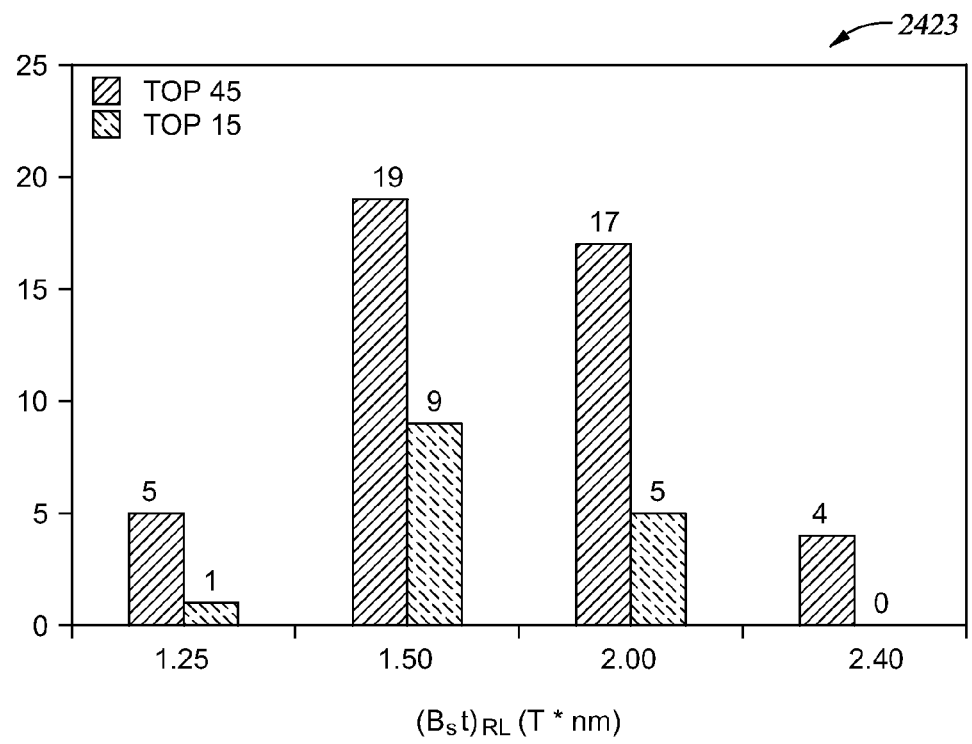
FIG. 24D shows a graph of a study of the optimal range of the value of the product of the saturated magnetization and thickness of the reference layer, $(B_s t)_{RL}$.

FIG. 24A is a graph 2417 showing the saturated magnetization of FGL 2218, $B_{s\text{-}FGL2}$, distributions that were studied for the 45 conditions in FIG. 23. The drawing also shows the distributions of the top 15. It is clear from the graph 2417 that the saturated magnetization of FGL 2218, $B_{s\text{-}FGL2}$, is greater than 1.6 T, preferably, at least 1.8 T. FIG. 24B is a graph 2419 showing the thickness of FGL 2218, $t_{FGL2}$, distributions that were studied for the 45 conditions in FIG. 23. The drawing also shows the distributions of the top 15. From the graph 2419, it is clear that thickness of FGL 2218, $t_{FGL2}$, of FGL 2218 is 3 to 5 nm. FIG. 24C is a graph 2421 showing the distributions of the thickness of the non-magnetic spin transfer layer 2220 between the FGL 2210 and FGL 2218 that was studied for the 45 conditions in FIG. 23. The drawing also shows the distributions of the top 15. From the graph 2421, it is clear that thickness of Cu or NiAl, $t_{\text{-}Cu12}$, is 0.2 to 0.7 nm. FIG. 24D is a graph 2423 showing the saturated magnetization of RL 2212, $(B_s t)_{RL}$, distributions that were studied for the 45 conditions in FIG. 23. It is clear that the saturated magnetization of RL 2212, $(B_s t)_{RL}$, is from 1.4 to 2.1 T·nm.

Figure 25A:
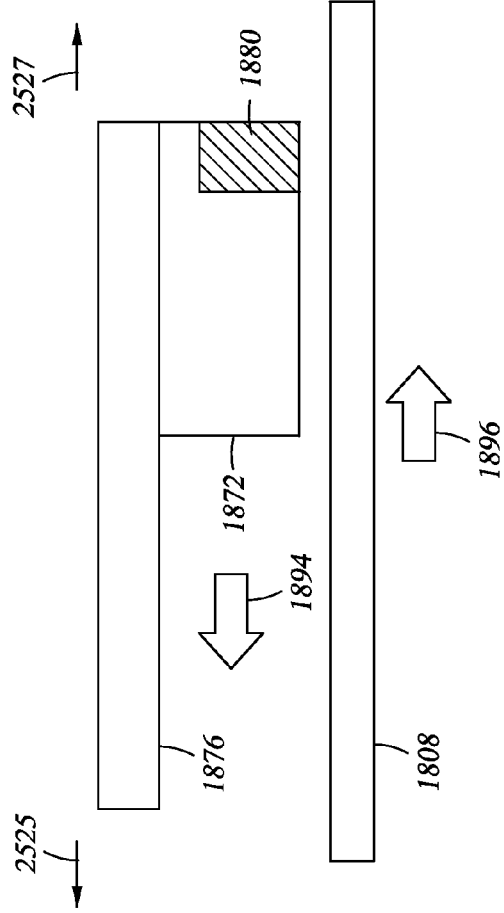
FIGS. 25A-25B illustrate structural examples of a magnetic head slider and a magnetic head.
Figure 25B:
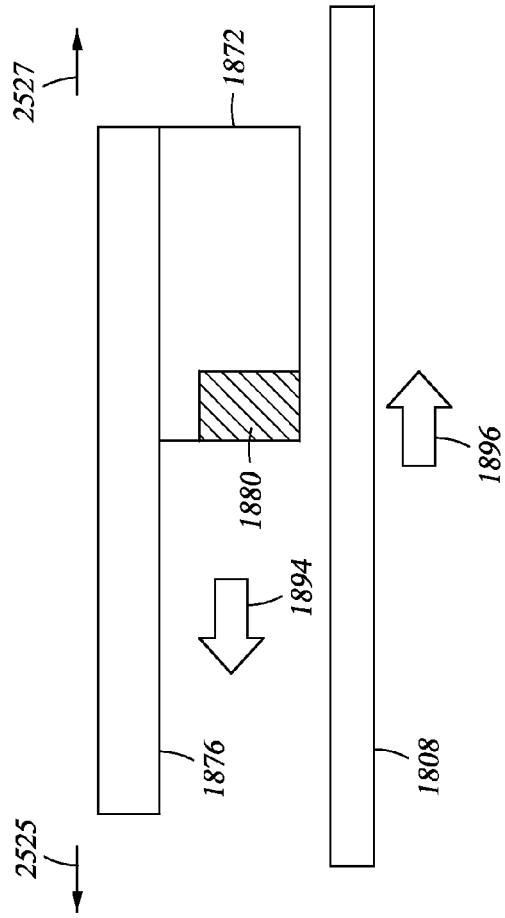

The positional relationship of the advancing direction of the magnetic head and the recording medium is explained with reference to FIGS. 25A and 25B. There are two mounting states on the magnetic head slider of the magnetic head. One is the arrangement on the trailing side shown in FIG. 25A. The other is the arrangement on the leading side shown in FIG. 25B. The trailing side and the leading side are determined by the direction of relative motion of the magnetic head slider with respect to the recording medium. As shown in FIGS. 25A and 25B, arrow 2525 represents the leading side, and arrow 2527 represents the trailing side, used in conjunction with arrow 1894 representing the travel direction of the magnetic head, and arrow 1896 representing the direction of rotation of the recording medium 1808. If the direction of rotation 1896 of the recording medium 1808 is reversed from the direction shown, FIG. 25A shows the installation on the leading side, or the direction of arrow 2527. FIG. 25B shows the installation on the trailing side, or the direction of arrow 2525. In principle, if the polarity of the spindle motor is reversed and the recording medium 1808 rotates in the reverse direction, the relationship between the trailing side and the leading side can be reversed. The rotational frequency must be accurately controlled, and it is not possible to change the polarity of the spindle motor. When an MAMR head incorporating the STO 2202 having the structure of condition 717 in FIG. 23 was used in the head 2200 of FIG. 22, and either arrangement shown in FIG. 25A or FIG. 25B was used, satisfactory signal-to-noise ratios and overwrite characteristics were obtained in recording and playback of a recording density that exceeds 1.5 Tbits/in².

Figure 26A:
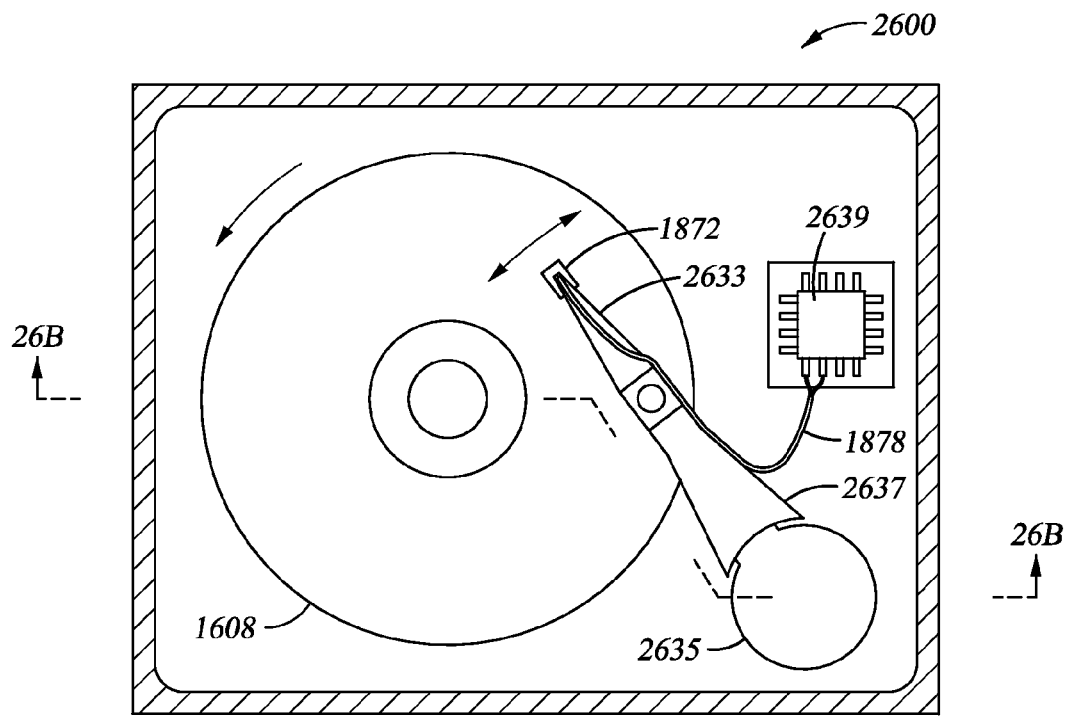
FIG. 26A-26B illustrate a schematic view of a magnetic recording device.
Figure 26B:
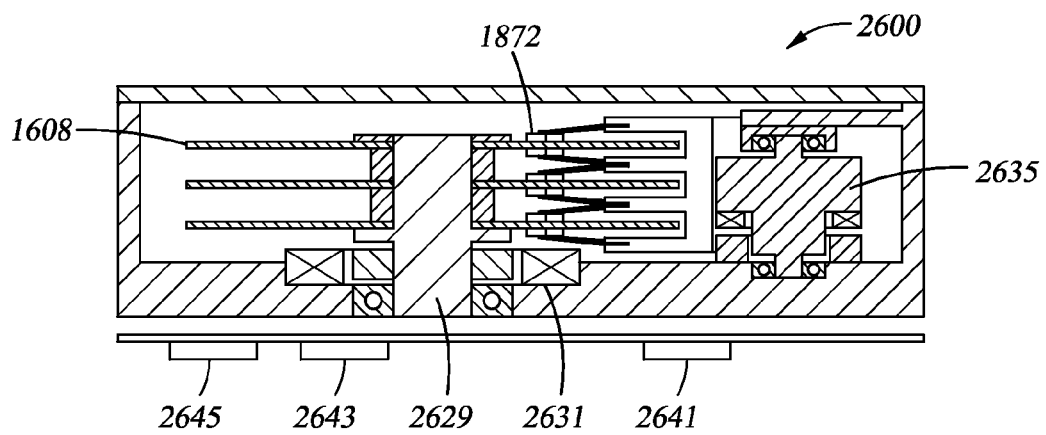

FIGS. 26A and 26B are schematic views showing the overall structure of the magnetic recording device 2600, according to one embodiment. FIG. 26A is the top view of the magnetic recording device 2600, and FIG. 26B is a cross-sectional view along the A-A' line of FIG. 26A. A recording medium 1608 is fixed to the rotation bearing 2629 and rotated by a motor 2631. FIG. 26B shows an example of three magnetic disks and six magnetic heads, but one or more magnetic disks and one or more magnetic heads are acceptable. The recording medium 1608 has an annular plate shape, and a recording layer is formed on both surfaces. A slider 1872 moves above the rotating recording medium 1608 in approximately the radial direction, and has a recording and playback unit 1880 in the front end. The recording and playback unit 1880 has, for example, a structure as shown in FIG. 18, and the main magnetic pole 1604 and the STO 1602 are provided in the recording unit.

A suspension 2633 is supported by a rotary actuator 2635 by an arm 2637. The suspension 2633 has the function where a slider 1872 pushes on or retracts the specified load from the recording medium 1608. The current for driving each structural element of the magnetic head is supplied by the wires 1878 from an IC amplifier 2639. The recording signal supplied to the recording head unit and the detected playback signal from the playback head unit are processed by a channel IC 2641 for reading and writing, as shown in FIG. 26B. In addition, the control operation of the magnetic recording device is implemented by the execution of the disk control program stored in a memory 2643 by a processor 2645. Consequently, in one embodiment, the processor 2645 and the memory 2643 comprise the so-called disk controller.

The invention is not limited to the working examples described above and includes various modifications. For example, the working examples described above were explained in detail to facilitate understanding of the present invention, and do not necessarily limit the invention to inventions providing all of the structures described above. In addition, a portion of the structure of some working example can be replaced by the structure of another working example, and the structure of another working example can be added to the structure of some other working example. In addition, a portion of the structure of each working example can be added, deleted, and replaced by another structure.

While the foregoing is directed to exemplified embodiments, other and further embodiments of the invention may be devised without departing from the basic scope thereof, and the scope thereof is determined by the claims that follow.

What is claimed is:

1. A microwave-assisted magnetic recording head, comprising:
   a main magnetic pole;
   a magnetic pole opposite the main magnetic pole; and
   a spin torque oscillator disposed between the main magnetic pole and the magnetic pole opposite the main magnetic pole, wherein the spin torque oscillator is comprised of: a first non-magnetic spin scatterer in physical contact with either the main magnetic pole or the magnetic pole opposite the main magnetic pole, a reference layer in physical contact with the first non-magnetic spin scatterer, a first non-magnetic spin transfer layer in physical contact with the reference layer, a first magnetic field generating layer in physical contact with the first non-magnetic spin transfer layer, a second non-magnetic spin transfer layer in physical contact with the first magnetic field generating layer, a second magnetic field generating layer in physical contact with the second non-magnetic spin transfer layer, and a second non-magnetic spin scatterer in physical contact with the second magnetic field generating layer, wherein the second non-magnetic spin scatterer is in physical contact with either the main magnetic pole or the magnetic pole opposite the main magnetic pole, and wherein:
   the first magnetic field generating layer is thicker than the second magnetic field generating layer; and
   a drive current flows in the direction from the first magnetic field generating layer to the reference layer.

2. The microwave-assisted magnetic recording head of claim 1, wherein the second magnetic field generating layer is 3 nanometers to 5 nanometers thick.

3. The microwave-assisted magnetic recording head of claim 2, wherein the first magnetic field generating layer is the thickest layer in the spin torque oscillator.

4. The microwave-assisted magnetic recording head of claim 1, wherein the first magnetic field generating layer has a larger saturated magnetization when compared to the second magnetic field generating layer.

5. The microwave-assisted magnetic recording head of claim 4, wherein the second field generating layer has a saturated magnetization of at least 1.6 Teslas.

6. The microwave-assisted magnetic recording head of claim 1, wherein the spin torque oscillator comprises in order from the main magnetic pole to the pole opposite the main magnetic pole: the second non-magnetic spin scatterer, the second magnetic field generating layer, the second non-magnetic spin transfer layer, the first magnetic field generating layer, the first non-magnetic spin transfer layer, the reference layer, and the first non-magnetic spin scatterer.

7. The microwave-assisted magnetic recording head of claim 1, wherein the first magnetic field generating layer and the second magnetic field generating layer comprise cobalt-iron alloy.

8. The microwave-assisted magnetic recording head of claim 1, wherein the reference layer comprises a nickel film.

9. The microwave-assisted magnetic recording head of claim 1, wherein the first non-magnetic spin scatterer or the second non-magnetic spin scatterer comprises ruthenium.

10. A microwave-assisted magnetic recording head, comprising:
    a main magnetic pole;
    a magnetic pole opposite the main magnetic pole; and
    a spin torque oscillator disposed between the main magnetic pole and the magnetic pole opposite the main magnetic pole, wherein the spin torque oscillator is comprised of: a first non-magnetic spin scatterer, a reference layer, a first non-magnetic spin transfer layer, a first magnetic field generating layer, a second non-magnetic spin transfer layer, a second magnetic field generating layer, and a second non-magnetic spin scatterer, wherein the spin torque oscillator comprises in order from the main magnetic pole to the pole opposite the main magnetic pole; the second non-magnetic spin scatterer, the second magnetic field generating layer, the second non-magnetic spin transfer layer, the first magnetic field generating layer, the first non-magnetic spin transfer layer, the reference layer, and the first non-magnetic spin scatterer, wherein the first non-magnetic spin transfer layer comprises nickel-aluminum, and wherein
    the first magnetic field generating layer is thicker than the second magnetic field generating layer; and
    a drive current flows in the direction from the first magnetic field generating layer to the reference layer.

11. The microwave-assisted magnetic recording head of claim 10, wherein the second non-magnetic spin transfer layer is thinner than 1 nanometer.

12. The microwave-assisted magnetic recording head of claim 10, wherein the main magnetic pole and the pole opposite the main magnetic pole comprise a cobalt-iron alloy.

13. The microwave-assisted magnetic recording head of claim 10, wherein the first magnetic field generating layer has a larger saturated magnetization than the second magnetic field generating layer.

14. The microwave-assisted magnetic recording head of claim 10, wherein the second magnetic field generating layer is 3 nanometers to 5 nanometers thick.

15. The microwave-assisted magnetic recording head of claim 10, wherein the first non-magnetic spin transfer layer or the second non-magnetic spin transfer layer comprises copper.

16. The microwave-assisted magnetic recording head of claim 10, wherein the first magnetic field generating layer is the thickest layer of the spin torque oscillator, a drive current flows in the direction from the pole opposite the main magnetic pole to the main magnetic pole, and the second non-magnetic spin transfer layer is the thinnest layer of the spin torque oscillator.

17. A hard disk drive, comprising:
    a rotary actuator;
    an arm;
    a magnetic head slider;
    a recording and playback unit disposed on the magnetic head slider;
    a microwave-assisted magnetic recording head;
    a main magnetic pole disposed on the recording and playback unit;

a magnetic pole opposite the main magnetic pole disposed on the recording and playback unit; and a spin torque oscillator disposed between the main magnetic pole and the magnetic pole opposite the main magnetic pole, wherein the spin torque oscillator is comprised of: a first non-magnetic spin scatterer in physical contact with either the main magnetic pole or the magnetic pole opposite the main magnetic pole, a reference layer in physical contact with the first non-magnetic spin scatterer, a first non-magnetic spin transfer layer in physical contact with the reference layer, a first magnetic field generating layer in physical contact with the first non-magnetic spin transfer layer, a second non-magnetic spin transfer layer in physical contact with the first magnetic field generating layer, a second magnetic field generating layer in physical contact with the second non-magnetic spin transfer layer, and a second non-magnetic spin scatterer in physical contact with the second magnetic field generating layer, wherein the second non-magnetic spin scatterer is in physical contact with either the main magnetic pole or the magnetic pole opposite the main magnetic pole, and wherein:

the first magnetic field generating layer is thicker than the second magnetic field generating layer; and a drive current flows in the direction from the first magnetic field generating layer to the reference layer.

18. The hard disk drive of claim 17, wherein the recording and playback unit is disposed on the trailing side of the magnetic head slider.

19. The hard disk drive of claim 17, wherein the recording and playback unit is disposed on the leading side of the magnetic head slider.

20. The hard disk drive of claim 17, wherein the spin torque oscillator comprises in order from the main magnetic pole to the pole opposite the main magnetic pole: the second non-magnetic spin scatterer, the second magnetic field generation layer, the second non-magnetic spin transfer layer, the first magnetic field generation layer, the first non-magnetic spin transfer layer, the reference layer, and the first non-magnetic spin scatterer.

* * * * *